(12) United States Patent
Sato

(10) Patent No.: US 11,936,979 B2
(45) Date of Patent: Mar. 19, 2024

(54) IMAGING DEVICE

(71) Applicant: Sony Semiconductor Solutions Corporation, Kanagawa (JP)

(72) Inventor: Yasushi Sato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 99 days.

(21) Appl. No.: 17/761,319

(22) PCT Filed: Sep. 16, 2020

(86) PCT No.: PCT/JP2020/035160
§ 371 (c)(1),
(2) Date: Mar. 17, 2022

(87) PCT Pub. No.: WO2021/060120
PCT Pub. Date: Apr. 1, 2021

(65) Prior Publication Data
US 2022/0345606 A1    Oct. 27, 2022

(30) Foreign Application Priority Data

Sep. 24, 2019 (JP) ................................. 2019-173428

(51) Int. Cl.
*H04N 23/667* (2023.01)
*B60R 1/28* (2022.01)
(Continued)

(52) U.S. Cl.
CPC ............ *H04N 23/667* (2023.01); *B60R 1/28* (2022.01); *G06V 20/56* (2022.01); *G06V 20/58* (2022.01);
(Continued)

(58) Field of Classification Search
CPC ...... G06V 20/58; G06V 20/56; G06V 20/582; G06V 20/584; G06V 20/586;
(Continued)

(56) References Cited

U.S. PATENT DOCUMENTS

2014/0253808 A1  9/2014  Tachi
2016/0165120 A1  6/2016  Lim
(Continued)

FOREIGN PATENT DOCUMENTS

JP    2013066146 A    4/2013
JP    2015061260 A    3/2015
(Continued)

OTHER PUBLICATIONS

International Search Report (PCT/ISA/210), International Application No. PCT/JP2020/035160, dated Oct. 22, 2020.

*Primary Examiner* — David N Werner
(74) *Attorney, Agent, or Firm* — Michael Best & Friedrich LLP

(57) ABSTRACT

Provided is an imaging device capable of adaptively acquiring a captured image according to an imaging condition. An imaging device (1) according to an embodiment includes: an imaging unit (10) that includes a pixel array (110) including a plurality of pixel groups each including N×N pixels (100) (N is an integer of 2 or more), and outputs a pixel signal read from each pixel; and a switching unit (14) that switches a reading mode in which the pixel signal is read from each of the pixels by the imaging unit, in which the switching unit switches the reading mode between an addition mode in which the pixel signals read from the N×N pixels included in the pixel group are added to form one pixel signal and an individual mode in which each of the pixel signals read from the N×N pixels included in the pixel group is individually output.

20 Claims, 29 Drawing Sheets

(51) Int. Cl.
*G06V 20/56* (2022.01)
*G06V 20/58* (2022.01)
*H04N 23/72* (2023.01)
*H04N 23/84* (2023.01)
*B60R 1/22* (2022.01)

(52) U.S. Cl.
CPC ........... *H04N 23/72* (2023.01); *H04N 23/843* (2023.01); *B60R 1/22* (2022.01)

(58) Field of Classification Search
CPC .... G06V 20/588; H04N 23/667; G60V 20/56; G60V 20/58; B60R 1/28
See application file for complete search history.

(56) References Cited

U.S. PATENT DOCUMENTS

| | | | |
|---|---|---|---|
| 2017/0171470 | A1 | 6/2017 | Sakioka |
| 2018/0367731 | A1* | 12/2018 | Gatti ................... H04N 21/4223 |
| 2019/0124277 | A1* | 4/2019 | Mabuchi ................ H04N 25/50 |
| 2019/0191084 | A1* | 6/2019 | Tsai ..................... H04N 23/667 |
| 2019/0202354 | A1 | 7/2019 | Shiga |
| 2019/0356850 | A1* | 11/2019 | Ashrafi ................ H04N 23/667 |
| 2020/0168014 | A1* | 5/2020 | Uliyar .................... G06V 20/46 |
| 2021/0152732 | A1* | 5/2021 | Eki ........................ G06V 10/462 |
| 2022/0132022 | A1* | 4/2022 | Torii ........................ H04N 23/51 |

FOREIGN PATENT DOCUMENTS

| | | |
|---|---|---|
| JP | 2016052041 A | 4/2016 |
| JP | 2018117220 A | 7/2018 |
| JP | 2019029985 A | 2/2019 |
| WO | WO-2018014917 A1 | 1/2018 |
| WO | WO-2018198766 A1 | 11/2018 |

\* cited by examiner

IMAGING DEVICE

FIELD

The present disclosure relates to an imaging device.

BACKGROUND

Conventionally, there is known a technology in which an imaging device performs imaging by controlling an exposure time, a gain for a pixel signal, and the like on the basis of a subject detected by an imaging element, brightness of an imaging environment, and the like.

CITATION LIST

Patent Literature

Patent Literature 1: JP 2013-066146 A

SUMMARY

Technical Problem

However, conventionally, for example, even for an imaging target for which high resolution is not required, imaging is performed at resolution similar to that in a normal case, and it is difficult to optimize power consumption and image processing resources.

An object of the present disclosure is to provide an imaging device capable of adaptively acquiring a captured image according to an imaging condition.

Solution to Problem

For solving the problem described above, an imaging device according to one aspect of the present disclosure has an imaging unit that includes a pixel array including a plurality of pixel groups each including N×N pixels (N is an integer of 2 or more), and outputs a pixel signal read from each pixel; and a switching unit that switches a reading mode in which the pixel signal is read from each of the pixels by the imaging unit, wherein the switching unit switches the reading mode between an addition mode in which the pixel signals read from the N×N pixels included in the pixel group are added to form one pixel signal and an individual mode in which each of the pixel signals read from the N×N pixels included in the pixel group is individually output.

BRIEF DESCRIPTION OF DRAWINGS

FIG. 6 is a schematic diagram for describing detection of an inter-same-color gradient applicable to an embodiment.

FIG. 7 is a schematic diagram for describing detection of an inter-different-color gradient applicable to an embodiment.

FIG. 22A is a schematic diagram illustrating an example of a pixel arrangement applicable to the present disclosure.

FIG. 22B is a schematic diagram illustrating an example of a pixel arrangement applicable to the present disclosure.

FIG. 22C is a schematic diagram illustrating an example of a pixel arrangement applicable to the present disclosure.

FIG. 22D is a schematic diagram illustrating an example of a pixel arrangement applicable to the present disclosure.

FIG. 22E is a schematic diagram illustrating an example of a pixel arrangement applicable to the present disclosure.

DESCRIPTION OF EMBODIMENTS

Hereinafter, embodiments of the present disclosure will be described in detail with reference to the drawings. Note that, in the following embodiments, the same reference signs denote the same portions, and an overlapping description will be omitted.

Hereinafter, embodiments of the present disclosure will be described in the following order.

1. Technology Applicable to Each Embodiment of Present Disclosure
   1-1. Configuration Applicable to Each Embodiment
   1-2. Schematic Description of Remosaic Processing
   1-3. Example of Pixel Reading Method
2. First Embodiment
   2-1. First Modified Example of First Embodiment
   2-2. Second Modified Example of First Embodiment
   2-3. Third Modified Example of First Embodiment
3. Second Embodiment
   3-1. Modified Example of Second Embodiment
4. Third Embodiment
   4-0. Example of Application to Moving Body
   4-1. Example of Application to Endoscopic Surgery System

1. Technology Applicable to Each Embodiment of Present Disclosure

1-1. Configuration Applicable to Each Embodiment

Figure 1:
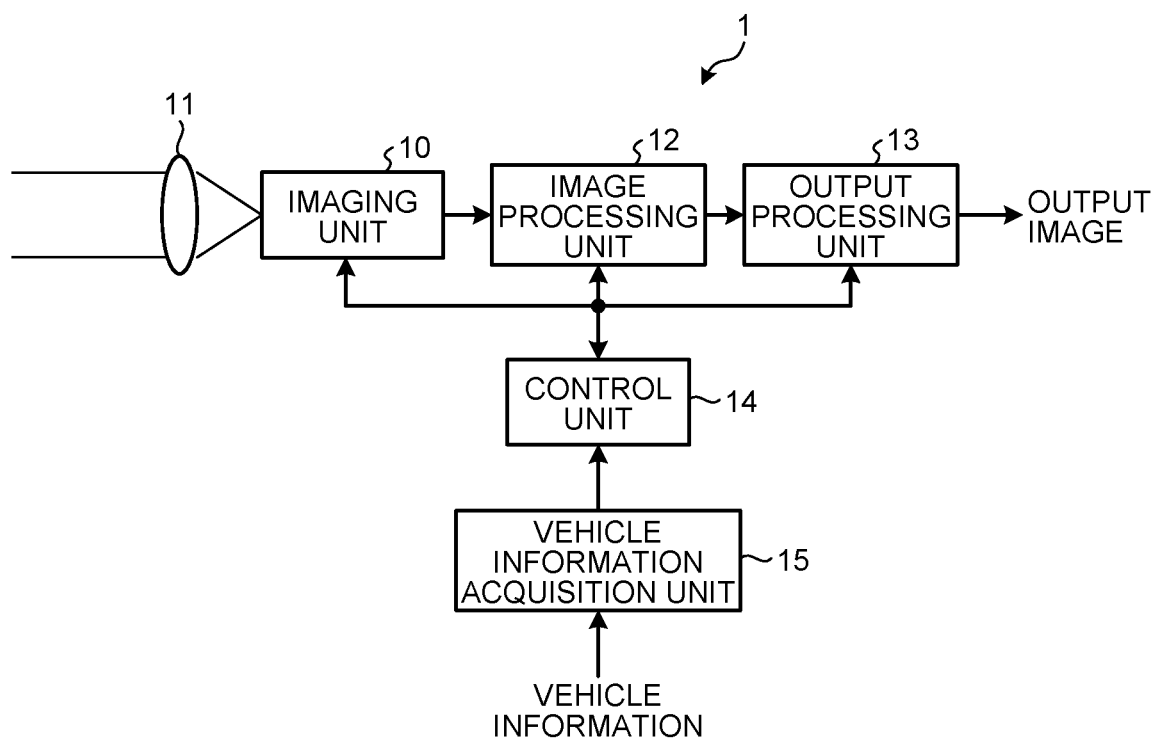
FIG. 1 is a functional block diagram of an example for describing functions of an imaging device applicable to each embodiment.

First, a technology applicable to each embodiment of the present disclosure will be described. FIG. 1 is a functional block diagram of an example for describing functions of an imaging device applicable to each embodiment.

In FIG. 1, an imaging device 1 includes an imaging unit 10, an optical unit 11, an image processing unit 12, an output processing unit 13, and a control unit 14. Furthermore, in a case where the imaging device 1 is used in a vehicle, the imaging device 1 further includes a vehicle information acquisition unit 15.

The imaging unit 10 includes a pixel array in which a plurality of pixels each including one or more light receiving elements are arranged in a matrix. Furthermore, the optical unit 11 includes a lens, a diaphragm mechanism, a focusing mechanism, and the like, and guides light from a subject to a light receiving surface of the pixel array.

The imaging unit 10 reads a pixel signal from each pixel exposed for a designated exposure time, performs signal processing such as noise removal or gain adjustment on the read pixel signal, and converts the pixel signal into digital pixel data. The imaging unit 10 outputs the pixel data based on the pixel signal. A series of operations of performing exposure, reading a pixel signal from an exposed pixel, and outputting the pixel signal as pixel data by the imaging unit 10 is referred to as imaging.

The image processing unit 12 performs predetermined image processing on the pixel data output from the imaging unit 10, and outputs the pixel data as image data in units of frames, for example. The image processing performed on the pixel data by the image processing unit 12 includes, for example, processing of combining and converting pixel data, and color adjustment processing such as white balance processing.

The output processing unit 13 converts the image data output from the image processing unit 12 into a format suitable for output from the imaging device 1. The output image data output from the output processing unit 13 is supplied to, for example, a display (not illustrated) and displayed as an image. Alternatively, the output image data may be supplied to another device such as a device that performs recognition processing on the output image data or a control device that performs a control on the basis of the output image data.

The control unit 14 controls an overall operation of the imaging device 1. The control unit 14 includes, for example, a central processing unit (CPU) and an interface circuit for performing communication with each unit of the imaging device 1, generates various control signals by the CPU operating according to a predetermined program, and controls each unit of the imaging device 1 according to the generated control signal.

Note that the image processing unit 12 and the output processing unit 13 described above can include, for example, a digital signal processor (DSP) or an image signal processor (ISP) that operates according to a predetermined program. Alternatively, one or both of the image processing unit 12 and the output processing unit 13 may be implemented by a program that operates on the CPU together with the control unit 14. These programs may be stored in advance in a nonvolatile memory included in the imaging device 1, or may be supplied from the outside to the imaging device 1 and written in the memory.

In a case where the imaging device 1 is mounted on a vehicle and used, the vehicle information acquisition unit 15 acquires vehicle information from the vehicle. The vehicle information acquisition unit 15 acquires, as the vehicle information, a speed of the vehicle, brightness in front of the vehicle, and the like. The vehicle information acquired by the vehicle information acquisition unit 15 is transferred to the control unit 14. The control unit 14 can instruct the imaging unit 10 or the image processing unit 12 to perform processing according to the transferred vehicle information.

Each pixel included in the pixel array included in the imaging unit 10 is provided with an optical filter that transmits light in a predetermined wavelength range. Unless otherwise specified, the optical filter that transmits light in a predetermined wavelength range will be described as a color filter. In a case of obtaining full-color image data, generally, three types of color filters including a color filter (hereinafter, an R color filter) that transmits light in a wavelength band of a red (R) color, a color filter (hereinafter, a G color filter) that transmits light in a wavelength band of a green (G) color, and a color filter (hereinafter, a B color filter) that transmits light in a wavelength band of a blue (B) color are used. An arrangement of the color filters of the R color, the G color, and the B color can be diverse, but in general, an arrangement called a Bayer arrangement is used.

Figure 2:
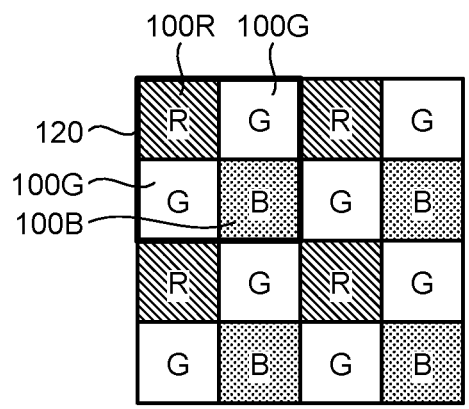
FIG. 2 is a diagram illustrating an example of a Bayer arrangement.

FIG. 2 is a diagram illustrating an example of the Bayer arrangement. In FIG. 2, a Bayer arrangement 120 includes two pixels 100G on which the G color filters are arranged, one pixel 100R on which the R color filter is arranged, and a pixel 100B on which the B color filter is arranged. In the Bayer arrangement, these four pixels are arranged in a grid pattern of 2×2 pixels so that the two pixels 100G are not adjacent to each other. In other words, the Bayer arrangement is an arrangement in which the pixels 100 on which the color filters that transmit light in the same wavelength band are arranged are not adjacent to each other.

Hereinafter, unless otherwise specified, the "pixel 100R on which the R color filter is arranged" is referred to as an "R color pixel 100R" or is simply referred to as a "pixel 100R". The same applies to the pixel 100G on which the G color filter is arranged and the pixel 100B on which the B color filter is arranged. Furthermore, when there is no need to particularly distinguish the color filters, each of the pixels 100R, 100G, and 100B will be collectively referred to as the pixel 100.

Figure 3:
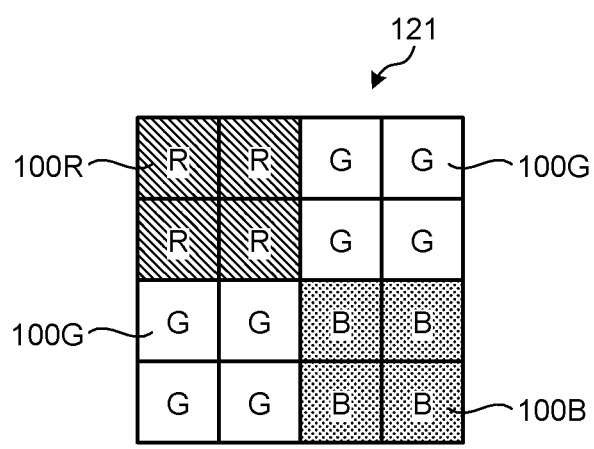
FIG. 3 is a diagram illustrating an example of a color filter arrangement applicable to each embodiment.

FIG. 3 is a diagram illustrating an example of a color filter arrangement applicable to each embodiment. In the arrangement of FIG. 3, each pixel block including four R color pixels 100R, four G color pixels 100G, and four B color pixels 100B is arranged in a pixel arrangement according to the Bayer arrangement, with a pixel block in which 2×2 pixels of the same color are arranged in a grid pattern as a unit. Hereinafter, unless otherwise specified, such a pixel arrangement is referred to as a Quad Bayer RGB arrangement.

More specifically, in the Quad Bayer RGB arrangement, the respective pixel blocks of the R color pixels 100R, the G color pixels 100G, and the B color pixels 100B are arranged in a 2×2 grid pattern so that a ratio between the number of pixels 100R, the number of pixels 100G, and the number of pixels 100B is 1:2:1, and pixel blocks of pixels of the same color are not adjacent to each other. In the example of FIG. 3, the pixel blocks of the G color pixels 100G are arranged on the left and under the pixel block of the R color pixels 100R, and the pixel block of the B color pixels 100B is arranged diagonally to the pixel block of the R color pixels 100R.

Figure 4:
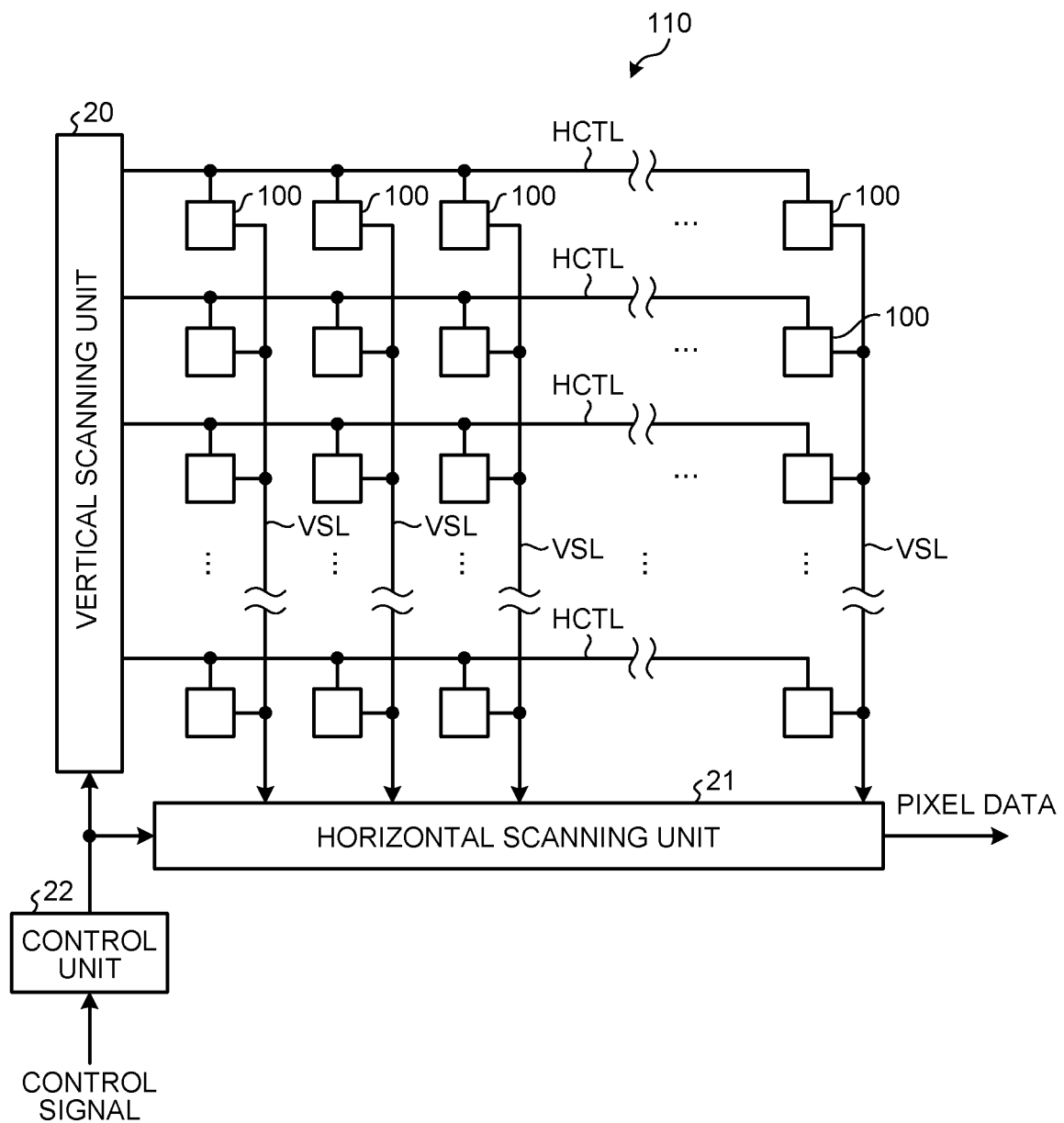
FIG. 4 is a block diagram illustrating a configuration of an example of an imaging unit applicable to each embodiment.

FIG. 4 is a block diagram illustrating a configuration of an example of the imaging unit 10 applicable to each embodiment. In FIG. 4, the imaging unit 10 includes a pixel array unit 110, a vertical scanning unit 20, a horizontal scanning unit 21, and a control unit 22.

The pixel array unit 110 includes a plurality of pixels 100 each including a light receiving element that generates a voltage corresponding to received light. A photodiode can be used as the light receiving element. In the pixel array unit 110, the plurality of pixels 100 are arranged in a matrix in a horizontal direction (row direction) and a vertical direction (column direction). In the pixel array unit 110, an arrangement of the pixels 100 in the row direction is referred to as a line. An image (image data) of one frame is formed on the basis of pixel signals read from a predetermined number of lines in the pixel array unit 110. For example, in a case where an image of one frame is formed with 3000 pixels×2000 lines, the pixel array unit 110 includes at least 2000 lines each including at least 3000 pixels 100.

In addition, in the pixel array unit 110, a pixel signal line HCTL is connected to each row of the pixels 100, and a vertical signal line VSL is connected to each column of the pixels 100.

An end of the pixel signal line HCTL that is not connected to the pixel array unit 110 is connected to the vertical scanning unit 20. The vertical scanning unit 20 transmits a plurality of control signals such as a drive pulse at the time of reading the pixel signal from the pixel 100 to the pixel array unit 110 via the pixel signal line HCTL according to the control signal supplied from the control unit 14, for example. An end of the vertical signal line VSL that is not connected to the pixel array unit 110 is connected to the horizontal scanning unit 21.

The horizontal scanning unit 21 includes an analog-to-digital (AD) conversion unit, an output unit, and a signal processing unit. The pixel signal read from the pixel 100 is transmitted to the AD conversion unit of the horizontal scanning unit 21 via the vertical signal line VSL.

A control of reading the pixel signal from the pixel 100 will be schematically described. The reading of the pixel signal from the pixel 100 is performed by transferring an electric charge accumulated in the light receiving element by exposure to a floating diffusion (FD) layer, and converting the electric charge transferred to the floating diffusion layer into a voltage. The voltage obtained by converting the electric charge in the floating diffusion layer is output to the vertical signal line VSL via an amplifier.

More specifically, in the pixel 100, during exposure, the light receiving element and the floating diffusion layer are disconnected from each other (open), and an electric charge generated corresponding to incident light by photoelectric conversion is accumulated in the light receiving element. After the exposure is completed, the floating diffusion layer and the vertical signal line VSL are connected according to a selection signal supplied via the pixel signal line HCTL. Further, the floating diffusion layer is connected to a supply line for a power supply voltage VDD or a black level voltage for a short time according to a reset pulse supplied via the pixel signal line HCTL, and the floating diffusion layer is reset. A reset level voltage (referred to as a voltage P) of the floating diffusion layer is output to the vertical signal line VSL. Thereafter, the light receiving element and the floating diffusion layer are connected to each other (closed) by a transfer pulse supplied via the pixel signal line HCTL, and the electric charge accumulated in the light receiving element is transferred to the floating diffusion layer. A voltage (referred to as a voltage Q) corresponding to the amount of the electric charge of the floating diffusion layer is output to the vertical signal line VSL.

In the horizontal scanning unit 21, the AD conversion unit includes an AD converter provided for each vertical signal line VSL, and the pixel signal supplied from the pixel 100 via the vertical signal line VSL is subjected to AD conversion processing by the AD converter, and two digital values (values respectively corresponding to the voltage P and the voltage Q) for correlated double sampling (CDS) processing for performing noise reduction are generated.

The two digital values generated by the AD converter are subjected to the CDS processing by the signal processing unit, and a pixel signal (pixel data) corresponding to a digital signal is generated. The generated pixel data is output from the imaging unit 10.

Under the control of the control unit 22, the horizontal scanning unit 21 performs selective scanning to select the AD converters for the respective vertical signal lines VSL in a predetermined order, thereby sequentially outputting the respective digital values temporarily held by the AD converters to the signal processing unit. The horizontal scanning unit 21 implements this operation by a configuration including, for example, a shift register, an address decoder, and the like.

The control unit 22 performs a drive control of the vertical scanning unit 20, the horizontal scanning unit 21, and the like. The control unit 22 generates various drive signals serving as references for operations of the vertical scanning unit 20 and the horizontal scanning unit 21. The control unit 22 generates a control signal to be supplied by the vertical scanning unit 20 to each pixel 100 via the pixel signal line HCTL on the basis of a vertical synchronization signal or an external trigger signal supplied from the outside (for example, the control unit 14) and a horizontal synchronization signal. The control unit 22 supplies the generated control signal to the vertical scanning unit 20.

On the basis of the control signal supplied from the control unit 22, the vertical scanning unit 20 supplies various signals including a drive pulse to the pixel signal line HCTL of the selected pixel row of the pixel array unit 110 to each pixel 100 line by line, and causes each pixel 100 to output the pixel signal to the vertical signal line VSL. The vertical scanning unit 20 is implemented by using, for example, a shift register, an address decoder, and the like.

The imaging unit 10 configured as described above is a column AD system complementary metal oxide semiconductor (CMOS) image sensor in which the AD converters are arranged for each column.

Figure 5:
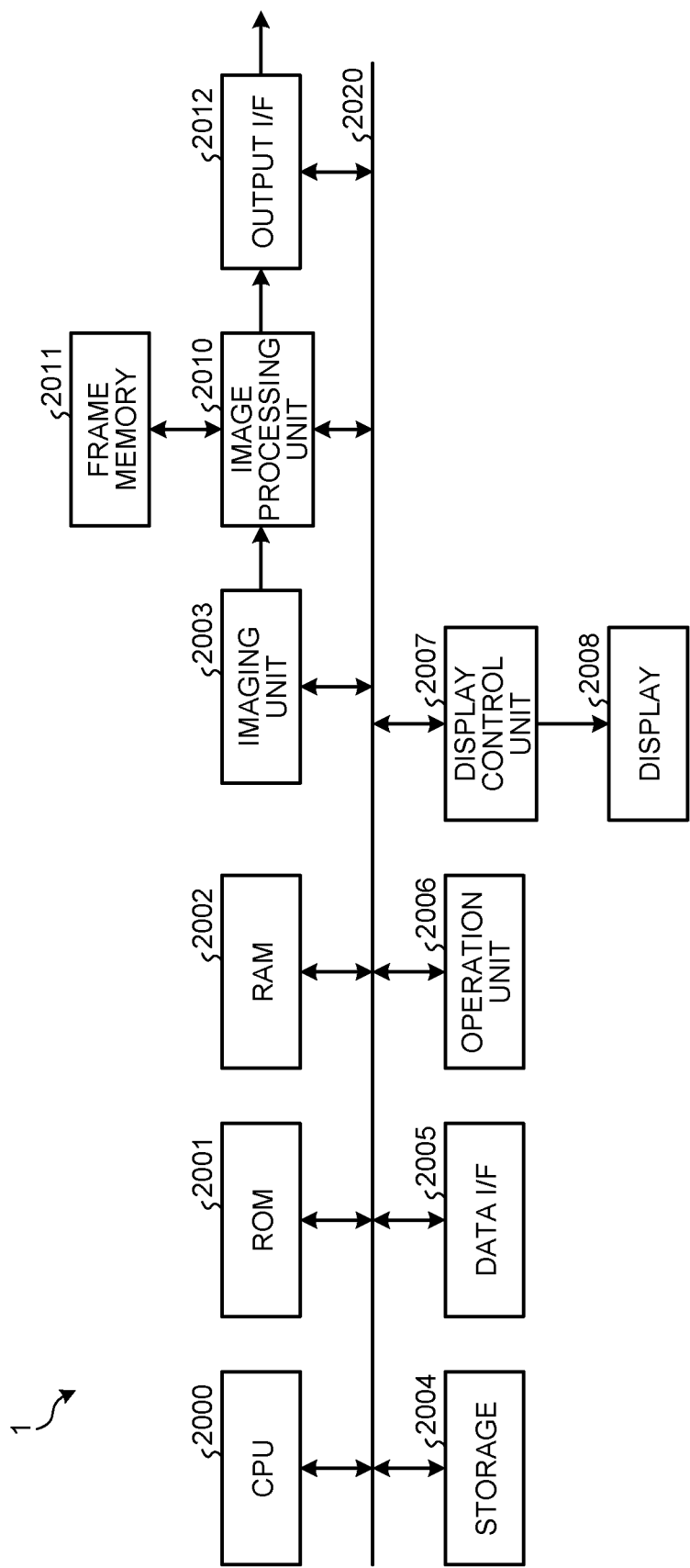
FIG. 5 is a block diagram illustrating an example of a hardware configuration of the imaging device applicable to each embodiment.

FIG. 5 is a block diagram illustrating an example of a hardware configuration of the imaging device 1 applicable to each embodiment. In FIG. 5, the imaging device 1 includes a CPU 2000, a read only memory (ROM) 2001, a random access memory (RAM) 2002, an imaging unit 2003, a storage 2004, a data interface (I/F) 2005, an operation unit 2006, and a display control unit 2007, each of which is connected by a bus 2020. In addition, the imaging device 1 includes an image processing unit 2010 and an output I/F 2012, each of which is connected by the bus 2020.

The CPU 2000 controls an overall operation of the imaging device 1 by using the RAM 2002 as a work memory according to a program stored in advance in the ROM 2001.

The imaging unit 2003 corresponds to the imaging unit 10 in FIG. 1, performs imaging, and outputs pixel data. The pixel data output from the imaging unit 2003 is supplied to the image processing unit 2010. The image processing unit 2010 performs predetermined image processing on the pixel data supplied from the imaging unit 10 by using a frame memory 2011 to generate image data in frame units.

The output I/F 2012 is an interface for outputting the image data generated by the image processing unit 2010 to the outside. The output I/F 2012 can convert the image data supplied from the image processing unit 2010 into image data of a predetermined format and output the image data.

The storage 2004 is, for example, a flash memory, and can store and accumulate the image data output from the image processing unit 2010. The storage 2004 can also store a program for operating the CPU 2000. Furthermore, the storage 2004 is not limited to the configuration built in the imaging device 1, and may be detachable from the imaging device 1.

The data I/F 2005 is an interface for the imaging device 1 to transmit and receive data to and from an external device. For example, a universal serial bus (USB) can be applied as the data I/F 2005. Furthermore, an interface that performs short-range wireless communication such as Bluetooth (registered trademark) can be applied as the data I/F 2005.

The operation unit 2006 receives a user operation with respect to the imaging device 1. The operation unit 2006 includes an operable element such as a dial or a button as an input device that receives a user input. The operation unit 2006 may include, as an input device, a touch panel that outputs a signal corresponding to a contact position.

The display control unit 2007 generates a display signal displayable by a display 2008 on the basis of a display control signal transferred by the CPU 2000. The display 2008 uses, for example, a liquid crystal display (LCD) as a display device, and displays a screen according to the display signal generated by the display control unit 2007. Note that the display control unit 2007 and the display 2008 can be omitted depending on the application of the imaging device 1.

1-2. Schematic Description of Remosaic Processing

Here, the remosaic processing described above will be schematically described. Processing modes for the pixel signal of each pixel in the Quad Bayer RGB arrangement include a mode (referred to as an addition mode) in which pixel signals of four pixels included in the pixel group are added and processed as one pixel signal and a mode (referred to as an individual mode) in which each of pixel signals of the four pixels is processed. Among them, in the individual mode, a pixel value of each pixel of the Quad Bayer RGB arrangement can be converted into, for example, a pixel value of each pixel in the Bayer arrangement by the remosaic processing.

The image processing unit 12 detects a gradient of the pixel value at a position of a pixel of interest in each direction, and determines a direction in which the detected gradient is the smallest. The image processing unit 12 predicts a pixel value of a pixel on the Bayer arrangement that corresponds to the position of the pixel of interest on the basis of the pixel value of the pixel in the detected direction, and replaces the pixel value of the pixel of interest with the predicted pixel value. As a result, the pixel value of each pixel in the Quad Bayer RGB arrangement is converted into the pixel value of each pixel in the Bayer arrangement.

Figures 6, 7:
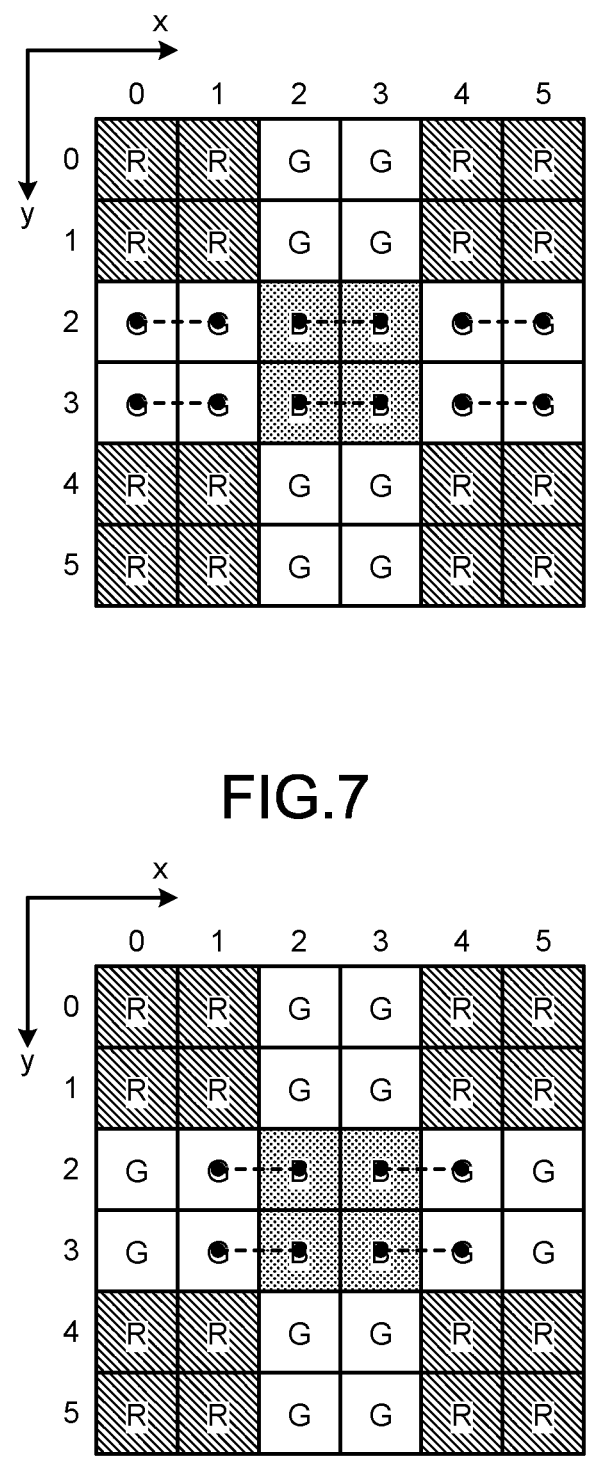

More specifically, the image processing unit 12 detects a gradient (inter-same-color gradient) between pixels of the same color as illustrated in FIG. 6 and a gradient (inter-different-color gradient) between pixels of different colors as illustrated in FIG. 7.

Note that, in FIGS. 6 and 7 and the following similar drawings, each square represents a pixel, and a character (R, G, or B) in each square represents a color (R color, G color, or B color) of a color filter corresponding to the pixel. Here, pixels on which the color filters of the R color, the G color, and the B color are respectively provided are referred to as a pixel R, a pixel G, and a pixel B, respectively. In addition, the upper-left square of the grid is the origin, the horizontal direction of the drawing is an x direction, the vertical direction is a y direction, and coordinates (x,y) are represented in pixel units. For example, in FIG. 6, a pixel at the origin is a pixel R with coordinates (0,0), and is described as a pixel (0,0).

In the example of FIG. 6, for the pixel G, the gradient is detected for each of sets of the same color including pixels G(0,2) and G(1,2), pixels G(4,2) and G(5,2), pixels G(0,3) and G(1,3), and pixels G(4,3) and G(5,3) in the x direction.

Furthermore, for the pixel B, the gradient is detected for each of sets of the same color including pixels B(2,2) and B(3,2) and pixels B(2,3) and B(3,3).

On the other hand, in the example of FIG. 7, the gradient is detected for each of sets of different colors including the pixel G(1,2) and the pixel B(2,2), the pixel G(1,3) and the pixel B(2,3), the pixel B(3,2) and the pixel G(4,2), and the pixel B(3,3) and the pixel G(4,3) in the x direction.

Here, detection of the inter-same-color gradient is gradient calculation for pixels having the same sensitivity. On the other hand, detection of the inter-different-color gradient is gradient calculation for pixels having different sensitivities, and the gradient depending on a sensitivity difference for each color of the pixel is calculated. Therefore, the image processing unit 12 detects the gradient by multiplying the pixel value of each of the pixel R and the pixel B included in the input image signal by a predetermined coefficient.

Figure 8:
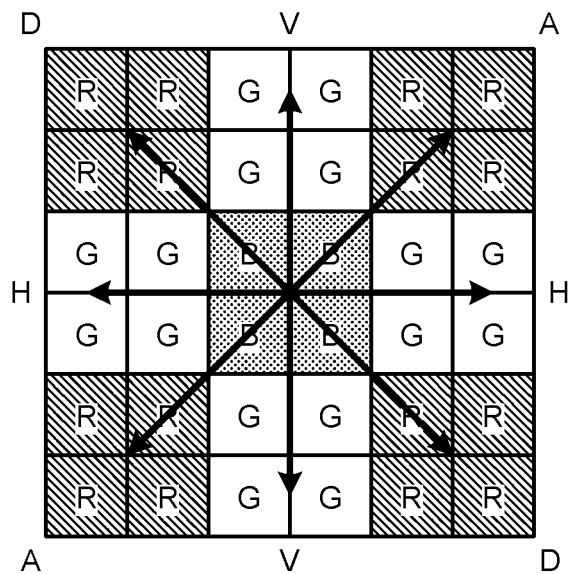
FIG. 8 is a diagram illustrating an example of a gradient calculation direction applicable to an embodiment.
Figure 9:
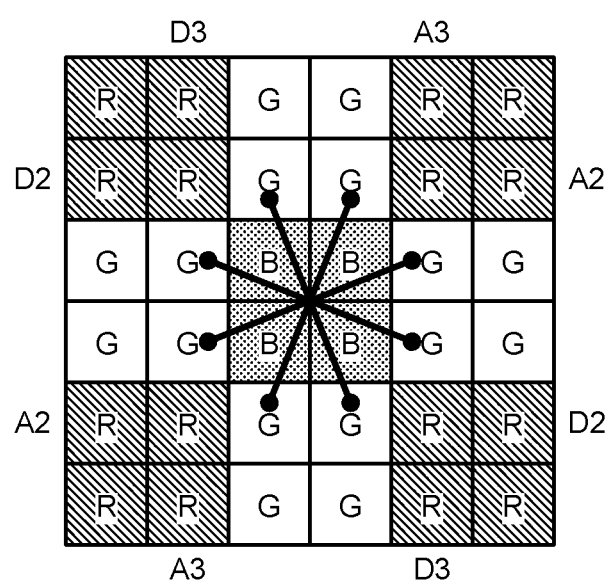
FIG. 9 is a diagram illustrating an example of a gradient calculation direction applicable to an embodiment.

A direction determination processing performed by the image processing unit 12 applicable to each embodiment will be described in more detail. The image processing unit 12 performs the gradient calculation for a local region in a plurality of directions. FIGS. 8 and 9 are diagrams illustrating an example of a gradient calculation direction applicable to an embodiment. In FIGS. 8 and 9 and the following similar drawings, a size of the local region is 6×6 pixels.

As illustrated in FIG. 8, the image processing unit 12 performs the gradient calculation in four directions, a horizontal direction (H), a vertical direction (V), an upper-right 45° direction (A), and a lower-right 45° direction (D). Further, as illustrated in FIG. 9, the image processing unit 12 performs the gradient calculation in four directions, an upper-right 22.5° direction (A2), an upper-right 67.5° direction (A3), a lower-right 22.5° direction (D2), and a lower-right 67.5° direction (D3). That is, in the embodiment, the image processing unit 12 performs the gradient calculation in eight directions at angles different from each other by 22.5°.

In the Quad Bayer RGB arrangement described with reference to FIG. 3, a sampling interval of the same color component is larger than that of the Bayer arrangement illustrated in FIG. 2, and thus, folding occurs at ½ of the Nyquist frequency. It is possible to detect such a frequency repetition pattern with high accuracy by performing the gradient calculation in each of the eight directions as illustrated in FIGS. 8 and 9.

The image processing unit 12 predicts the pixel value of the pixel corresponding to the position of the pixel of interest in the Bayer arrangement on the basis of the gradient determination result, and replaces the pixel value of the pixel of interest with the predicted pixel value.

1-3. Example of Pixel Reading Method

Figure 10:
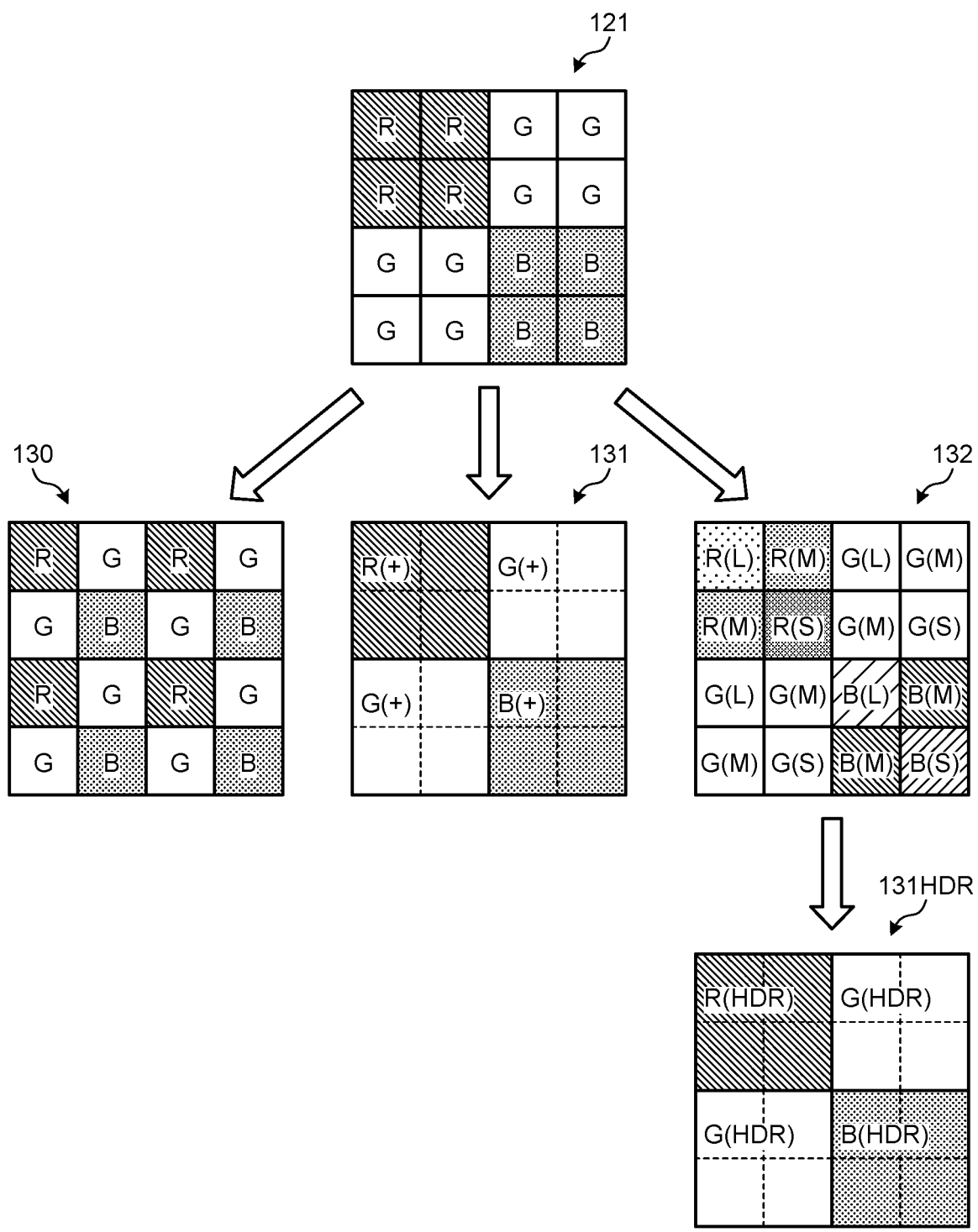
FIG. 10 is a schematic diagram for describing an example of a method of reading a pixel signal in a divided Bayer type RGB arrangement.

Next, an example of reading the pixel signal in the Quad Bayer RGB arrangement will be described. FIG. 10 is a schematic diagram for describing an example of a method of reading the pixel signal in a divided Bayer type RGB arrangement. In FIG. 10, an arrangement 121 indicates a pixel arrangement according to the Quad Bayer RGB arrangement. An arrangement 130 indicates an example of a pixel data arrangement obtained by performing reading in the above-described individual mode with respect to the arrangement 121 and performing the remosaic processing to convert the pixel value of each pixel into the pixel value in the Bayer arrangement.

An arrangement 131 indicates an example of an arrangement obtained by performing reading in the above-described addition mode with respect to the arrangement 121. As described above, in the addition mode, four pixels included in a pixel group are collectively treated as one pixel. In the example of FIG. 10, as illustrated in the arrangement 131, four pixels R included in a pixel group of the pixels R in the Quad Bayer RGB arrangement (arrangement 121) are treated as one pixel R(+) by addition of the pixel values. Similarly, four pixels G included in a pixel group of the pixels G in the arrangement 121 are treated as one pixel G(+) by addition of the pixel values, and four pixels B included in a pixel group of the pixels B are treated as one pixel B(+) by addition of the pixel values.

An arrangement 132 indicates an example of an arrangement obtained by making an exposure time of at least one pixel among the four pixels included in the pixel group in the arrangement 121 different from exposure times of other pixels included in the pixel group. In the example of FIG. 10, an exposure time of one pixel of the four pixels included in the pixel group is a first exposure time, exposure times of two pixels are second exposure times longer than the first exposure time, and an exposure time of the remaining one pixel is a third exposure time longer than the second exposure time. Hereinafter, reading with the first exposure time is referred to as short accumulation, reading with the second exposure time is referred to as medium accumulation, and reading with the third exposure time is referred to as long accumulation.

In FIG. 10, for example, in the pixel group of the pixels R, the upper-left pixel is a long-accumulation pixel R(L), the upper-right pixel and the lower-left pixel are medium-accumulation pixels R(M), and the lower-right pixel is a short-accumulation pixel R(S). Similarly, in the pixel group of the pixels G, the upper-left pixel is a long-accumulation pixel G(L), the upper-right pixel and the lower-left pixel are medium-accumulation pixels G(M), and the lower-right pixel is a short-accumulation pixel G(S). Further, in the pixel group of the pixels B, the upper-left pixel is a long-accumulation pixel B(L), the upper-right pixel and the lower-left pixel are medium-accumulation pixels B(M), and the lower-right pixel is a short-accumulation pixel B(S).

In the arrangement 132, pixel data (image data) read by the short accumulation, the medium accumulation, and the long accumulation are combined to generate one piece of image data. Image data with a higher dynamic range can be generated by combining image data based on pixel data exposed for different exposure times. An image with a high dynamic range generated in this manner is referred to as a high dynamic range (HDR) image. Furthermore, such an imaging method is referred to as HDR imaging.

In the example of FIG. 10, as shown in an arrangement 131HDR, for example, in the pixel group of the pixels R, a pixel R(L), two pixels R(M), and a pixel R(S) are combined by the HDR imaging, and a pixel R(HDR) having a size corresponding to the pixel group is generated. Similarly, in each of the pixel groups of the pixels G and B, pixels G(HDR) and B(HDR) each having a size corresponding to the pixel group are generated.

Figure 11:
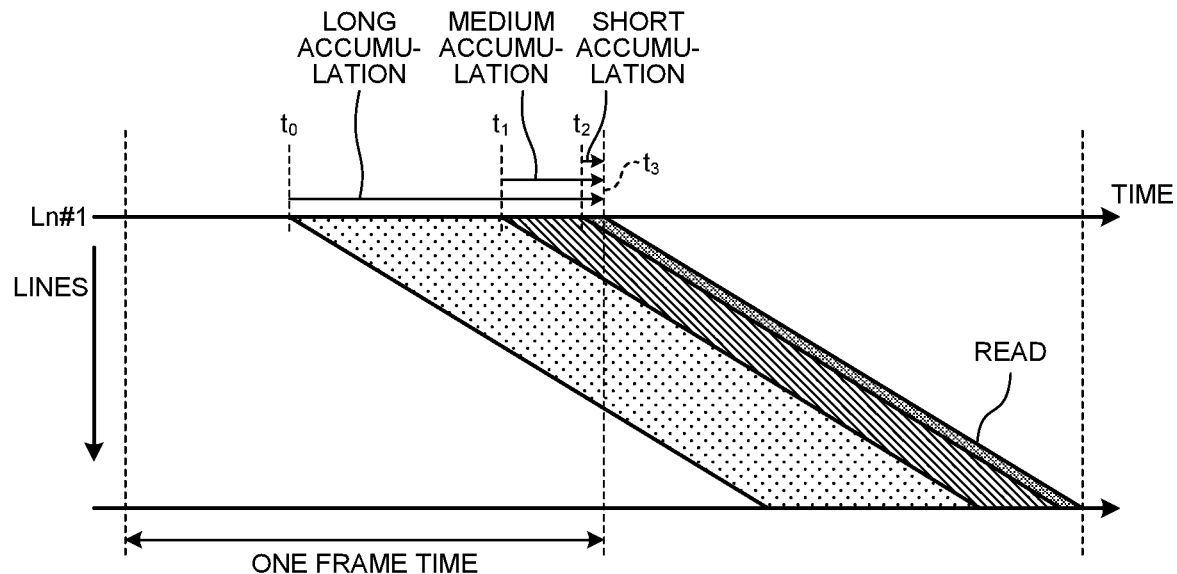
FIG. 11 is a schematic diagram for describing a first example of HDR imaging.
Figure 12:
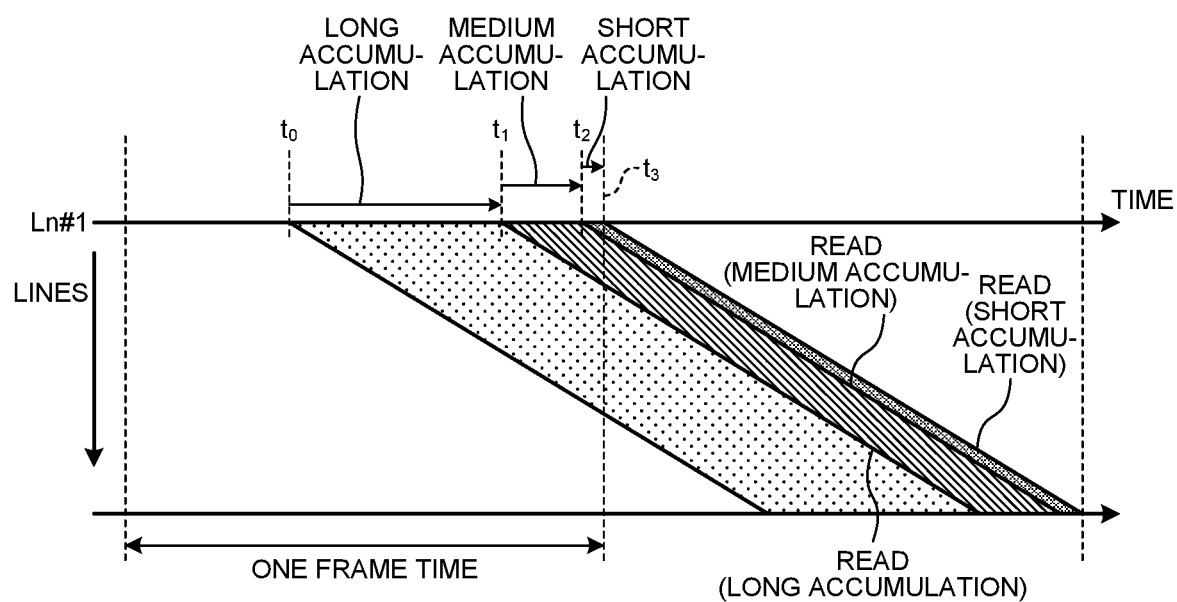
FIG. 12 is a schematic diagram for describing a second example of the HDR imaging.

FIG. 11 is a schematic diagram for describing a first example of the HDR imaging. In FIG. 11 and FIG. 12 to be described later, the time increases to the right. In addition, lines are shown in the vertical direction, a line at an upper end of a frame is a line Ln #1, and reading is sequentially performed from the line Ln #1 toward a lower end side of the frame (rolling shutter method).

In the first example of the HDR imaging, long-accumulation exposure, medium-accumulation exposure, and short-accumulation exposure are performed in parallel, and reading from a pixel by the long accumulation, reading from a pixel by the medium accumulation, and reading from a pixel by the short accumulation are simultaneously performed.

For example, in the line Ln #1, the long-accumulation exposure is started at a time $t_0$ in one frame time, and the medium-accumulation exposure is started at a time $t_1$ when a predetermined time has elapsed from the time $t_0$. Further, the short-accumulation exposure is started at a time $t_2$ when a predetermined time has elapsed from the time $t_1$. At a time $t_3$ when a predetermined time has elapsed from the time $t_2$, each of the long-accumulation exposure, the medium-accumulation exposure, and the short-accumulation exposure is terminated, and reading from a pixel by each of the long accumulation, the medium accumulation, and the short accumulation is performed.

FIG. 12 is a schematic diagram for describing a second example of the HDR imaging. In the second example of the HDR imaging, the long-accumulation exposure, the medium-accumulation exposure, and the short-accumulation exposure are sequentially performed, and reading from a pixel is performed for each exposure.

For example, in the line Ln #1, the long-accumulation exposure is started at a time $t_0$ in one frame time, the long-accumulation exposure is terminated at a time $t_1$ when a predetermined time has elapsed from the time to, and reading from a long-accumulation pixel is performed. Next, the medium-accumulation exposure is started at the time $t_1$, the medium-accumulation exposure is terminated at a time $t_2$ when a predetermined time has elapsed from the time $t_1$, and reading from a medium-accumulation pixel is performed. Further, the short-accumulation exposure is started at the time $t_2$, the short-accumulation exposure is terminated at a time $t_3$ when a predetermined time has elapsed from the time $t_2$, and reading from a short-accumulation pixel is performed. That is, in the second example of the HDR imaging, in each line, the exposure is performed for three times in one frame. That is, the long-accumulation exposure, the medium-accumulation exposure, and the short-accumulation exposure are performed in one frame time.

Figure 13:
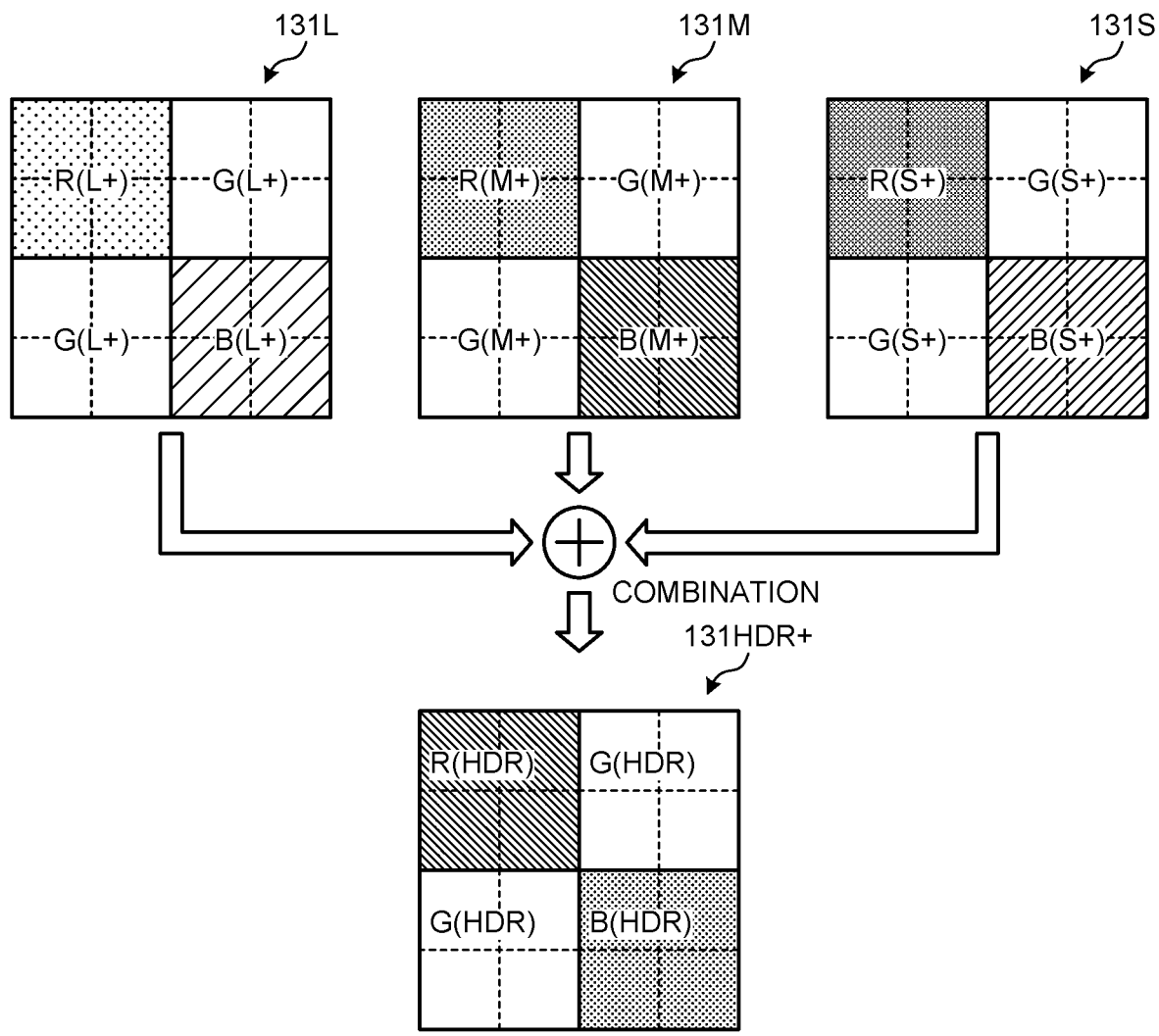
FIG. 13 is a schematic diagram for describing an example of a case where an addition mode is applied to the second example of the HDR imaging.

In the second example of the HDR imaging, both the addition mode and the individual mode described above are applicable. FIG. 13 is a schematic diagram for describing an example of a case where the addition mode is applied to the second example of the HDR imaging.

In the upper part of FIG. 13, an arrangement 131L indicates an example of an arrangement obtained by performing the long-accumulation exposure on the arrangement 121 and performing reading in the addition mode, an arrangement 131M indicates an example of an arrangement obtained by performing the medium-accumulation exposure on the arrangement 121 and performing reading in the addition mode, and an arrangement 131S indicates an example of an arrangement obtained by performing the short-accumulation exposure on the arrangement 121 and performing reading in the addition mode. The arrangement 131L indicates an example of an arrangement obtained by performing the long-accumulation exposure and performing reading in the addition mode, the arrangement 131M indicates an example of an arrangement obtained by performing the medium-accumulation exposure and performing reading in the addition mode, and the arrangement 131S indicates an example of an arrangement obtained by performing the short-accumulation exposure and performing reading in the addition mode. For example, in the pixel group of the pixels R in the arrangement 131L, four pixels R(L) subjected to the long-accumulation exposure are treated as one pixel R(L+) by addition of the pixel values. In the arrangement 131M, four pixels R(M) subjected to the medium-accumulation exposure are treated as one pixel R(M+) by addition of the pixel values. Furthermore, in the arrangement 131S, four pixels R(M) subjected to the medium-accumulation exposure are treated as one pixel R(M+) by addition of the pixel values. The same applies to the pixel groups of the other pixels G and B.

An arrangement 131HDR+ indicates an example in which the pixels in the arrangements 131L, 131M, and 131S are combined. In the arrangement 131HDR+, the pixels R(L+), R(M+), and R(S+) are combined to obtain a pixel R(HDR+) having a high dynamic range. Similarly, the pixels G(L+), G(M+), and G(S+), and the pixels B(L+), B(M+), and B(S+) are combined to obtain pixels R(HDR+), G(HDR+), and B(HDR+) each having a high dynamic range, respectively. That is, the arrangement 131HDR+ is an arrangement obtained by combining the pixels in the arrangements 131L, 131M, and 131S in units of pixel groups.

Figure 14:
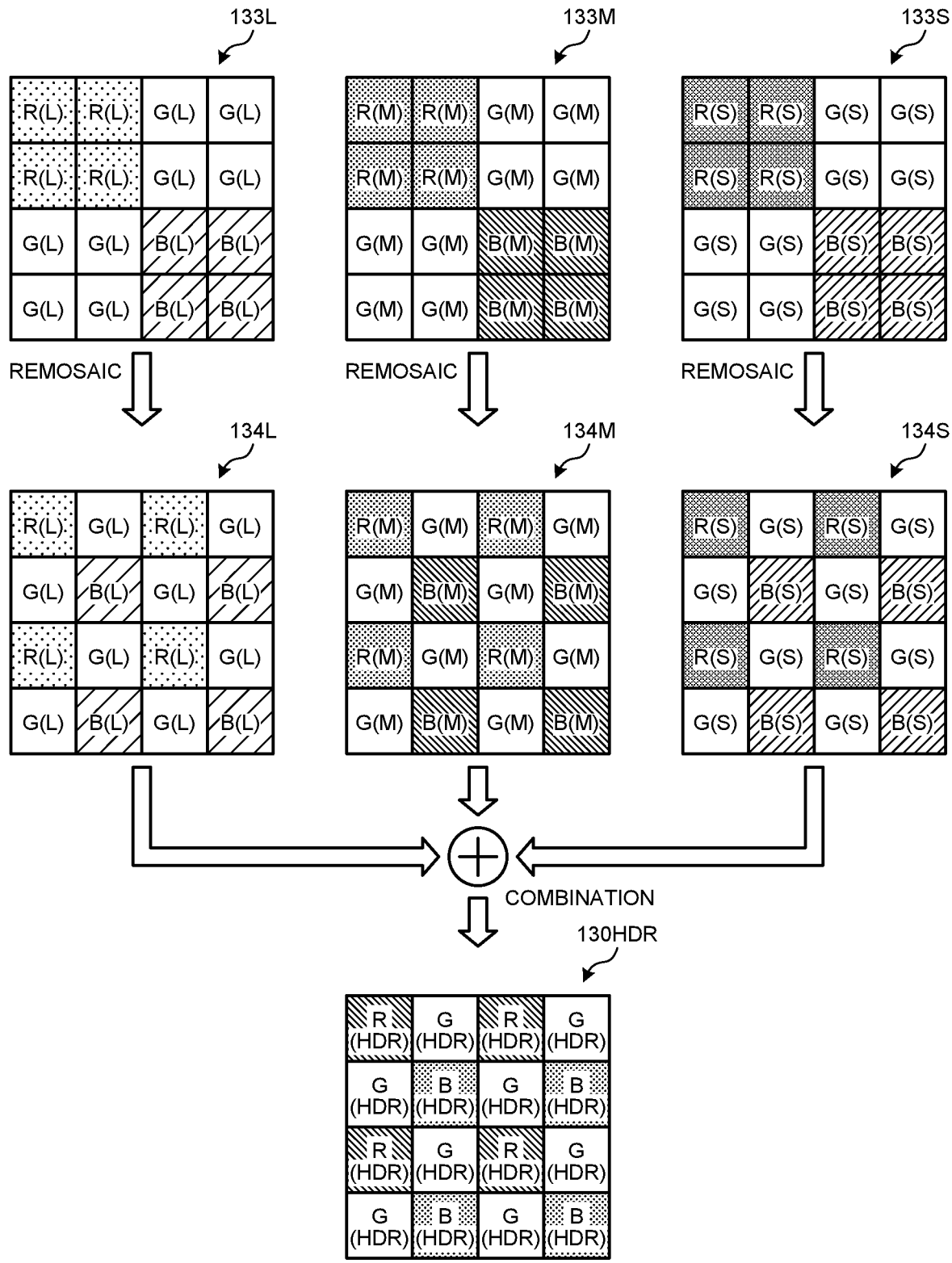
FIG. 14 is a schematic diagram for describing an example of a case where remosaic processing is performed by applying an individual mode to the second example of the HDR imaging.

FIG. 14 is a schematic diagram for describing an example of a case where the remosaic processing is performed by applying the individual mode to the second example of the HDR imaging. Arrangements 133L, 133M, and 133S correspond to the arrangements 131L, 131M, and 131S in FIG. 13, respectively, and four pixels included in each pixel group are illustrated separately. Arrangements 134L, 134M, and 134S indicate examples in which the remosaic processing is performed on each pixel of the arrangements 133L, 133M, and 133S, and pixel values of four pixels included in each pixel group are converted into pixel values of the respective pixels in the Bayer arrangement. In this case, the arrangement 134L includes only each pixel value based on long-accumulation pixel data, and similarly, the arrangement 134M includes only each pixel value based on medium-accumulation pixel data, and the arrangement 134S includes only each pixel value based on short-accumulation pixel data.

An arrangement 135HDR illustrated in the lower part of FIG. 14 is obtained by combining pixels whose positions correspond to each other in the arrangements 134L, 134M, and 134S. As described above, in the second example of the HDR imaging, a high dynamic range can be obtained in each pixel corresponding to the Bayer arrangement.

Here, a difference between the first example and the second example of the HDR imaging described above will be described with reference to FIGS. 10, 13, and 14. In the first example of the HDR imaging, for example, pixels allocated to the long accumulation (alternatively, medium accumulation or short accumulation) are four pixels among 16 pixels included in the Quad Bayer RGB arrangement (see the arrangement 132 in FIG. 10). On the other hand, in the second example of the HDR imaging, all 16 pixels are allocated to the long accumulation (alternatively, medium accumulation or short accumulation) (see the arrangements 131L, 131M and 131S in FIG. 13). Therefore, in a case where the resolutions are the same, the second example is advantageous over the first example in terms of a signal-noise ratio (SNR).

Furthermore, in the first example of the HDR imaging, since the exposure times of the four pixels included in the pixel group are different (see the arrangement 132 in FIG. 10), it is difficult to apply the remosaic processing. On the other hand, in the second example of the HDR imaging, since the exposure times of the 16 pixels included in the Quad Bayer RGB arrangement are the same, the remosaic processing can be easily applied (see FIG. 14). Thus, in terms of resolution, the second example is advantageous over the first example.

On the other hand, compared to the individual mode, the addition mode is advantageous over the individual mode in terms of the fact that pixel reading can be performed at a high speed and in terms of the SNR. In addition, since the remosaic processing can be performed in the individual mode, the individual mode is advantageous over the addition mode in terms of resolution. In each embodiment, pixel reading performed by the imaging unit 10 is performed by adaptively switching between the addition mode and the individual mode. This makes it possible to perform imaging adapted to an imaging purpose or an imaging condition such as an imaging environment.

2. First Embodiment

Figure 15:
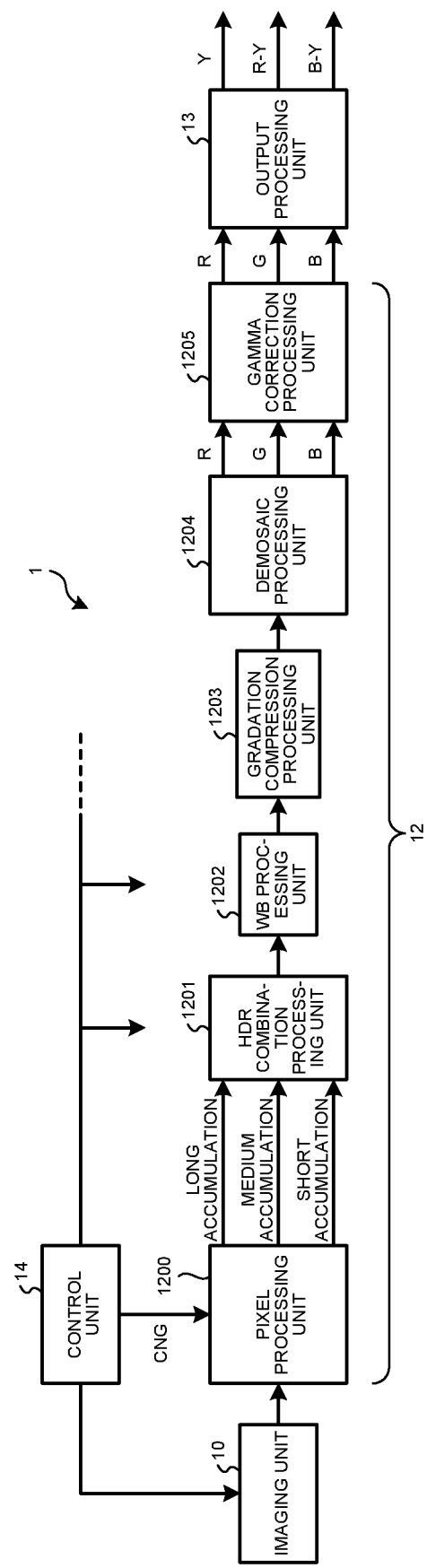
FIG. 15 is a functional block diagram of an example for describing functions of an imaging device according to a first embodiment.

Next, a first embodiment of the present disclosure will be described. The first embodiment is an example of a case where switching between the addition mode and the individual mode is implemented by image processing. FIG. 15 is a functional block diagram of an example for describing functions of an imaging device 1 according to the first embodiment.

The imaging device 1 illustrated in FIG. 15 performs imaging according to the second example of the HDR imaging described above. That is, in an imaging unit 10, color filters of the R color, the G color, and the B color are provided for pixels 100 of a pixel array unit 110 according to the Quad Bayer RGB arrangement. A control unit 14 controls the imaging unit 10 so as to perform imaging by each of the long accumulation, the medium accumulation, and the short accumulation described above with reference to FIG. 12. The imaging unit 10 supplies, to an image processing unit 12, pixel data captured by each of the long-accumulation exposure, the medium-accumulation exposure, and the short-accumulation exposure, and read from each pixel 100.

In the imaging device 1 according to the first embodiment, the image processing unit 12 includes a pixel processing unit 1200, an HDR combination processing unit 1201, a white balance (WB) processing unit 1202, a gradation compression processing unit 1203, a demosaic processing unit 1204, a gamma correction processing unit 1205, and an output processing unit 1206.

The pixel processing unit 1200, the HDR combination processing unit 1201, the WB processing unit 1202, the gradation compression processing unit 1203, the demosaic processing unit 1204, the gamma correction processing unit 1205, and the output processing unit 1206 are implemented, for example, by executing a predetermined program on a processor such as a DSP, an ISP, or a CPU. Alternatively, some or all of the pixel processing unit 1200, the HDR combination processing unit 1201, the WB processing unit 1202, the gradation compression processing unit 1203, the demosaic processing unit 1204, the gamma correction processing unit 1205, and the output processing unit 1206 may be implemented by hardware circuits that operate in cooperation with each other.

The pixel processing unit 1200 performs addition processing of adding pixel values of four pixels included in a pixel group to pixel data supplied from the imaging unit 10 in the addition mode, and remosaic processing based on each pixel data in the individual mode. The pixel processing unit 1200 performs switching between the addition processing and the remosaic processing to be performed according to a switching control signal CNG supplied from the control unit 14. The pixel processing unit 1200 performs the addition processing or the remosaic processing on each of long-accumulation pixel data, medium-accumulation pixel data, and short-accumulation pixel data supplied from the imaging unit 10.

Each of the long-accumulation pixel data, the medium-accumulation pixel data, and the short-accumulation pixel data that are subjected to the addition processing or the remosaic processing in the pixel processing unit 1200 is supplied to the HDR combination processing unit 1201. Note that each pixel data at this time point is raw data corresponding to a color of a color filter positioned at a corresponding position or a color of a position after being subjected to the remosaic processing.

The HDR combination processing unit 1201 performs an HDR combination processing of combining the long-accumulation pixel data, the medium-accumulation pixel data, and the short-accumulation pixel data supplied from the pixel processing unit 1200 to generate an HDR image. The pixel data subjected to the HDR combination processing has a bit depth of about 20 to 24 bits, and has a higher dynamic range than normal pixel data having a bit depth of about 8 to 10 bits, for example.

For example, when the HDR combination processing is performed on the pixel data corresponding to one frame, the HDR combination processing unit 1201 outputs pixel data corresponding to one frame generated by the HDR combination processing as image data for each frame. The image data (HDR image data) output from the HDR combination processing unit 1201 is supplied to the WB processing unit 1202, subjected to known white balance processing by the WB processing unit 1202, and supplied to the gradation compression processing unit 1203. The gradation compression processing unit 1203 compresses a gradation of the supplied image data and generates image data having a gradation suitable for processing in the subsequent stage. For example, the gradation compression processing unit 1203 converts the bit depth of each pixel data included in the image data from a bit depth of 20 to 24 bits resulting from the HDR combination processing to a bit depth of, for example, about 8 bits to 10 bits, and performs gradation compression.

The gradation compression processing unit 1203 supplies the image data subjected to the gradation compression processing to the demosaic processing unit 1204. The demosaic processing unit 1204 performs known demosaic processing on the supplied image data, and assigns a pixel value of each of the R color, the G color, and the B color to each pixel. The demosaic processing performed by the demosaic processing unit 1204 is, for example, processing of assigning the pixel value of each of the R color, the G color, and the B color to one pixel of interest by using a pixel value of the pixel of interest and a pixel value of each pixel in the vicinity of the pixel of interest.

The demosaic processing unit 1204 supplies data of components of the R color, the G color, and the B color of the image data subjected to the demosaic processing to the gamma correction processing unit 1205. The gamma correction processing unit 1205 performs gamma correction processing on the basis of the supplied data, and supplies data of each component of the R color, the G color, and the B color subjected to the gamma correction to the output processing unit 13. The output processing unit 13 converts the data of each component of the R color, the G color, and the B color supplied from the gamma correction processing unit 1205 into data of a format suitable for subsequent processing. In the example of FIG. 15, the output processing unit 13 converts the data of each component of the R color, the G color, and the B color into image data including a luminance component Y and each of chrominance components R-Y and B-Y, and outputs the image data.

Figure 16:
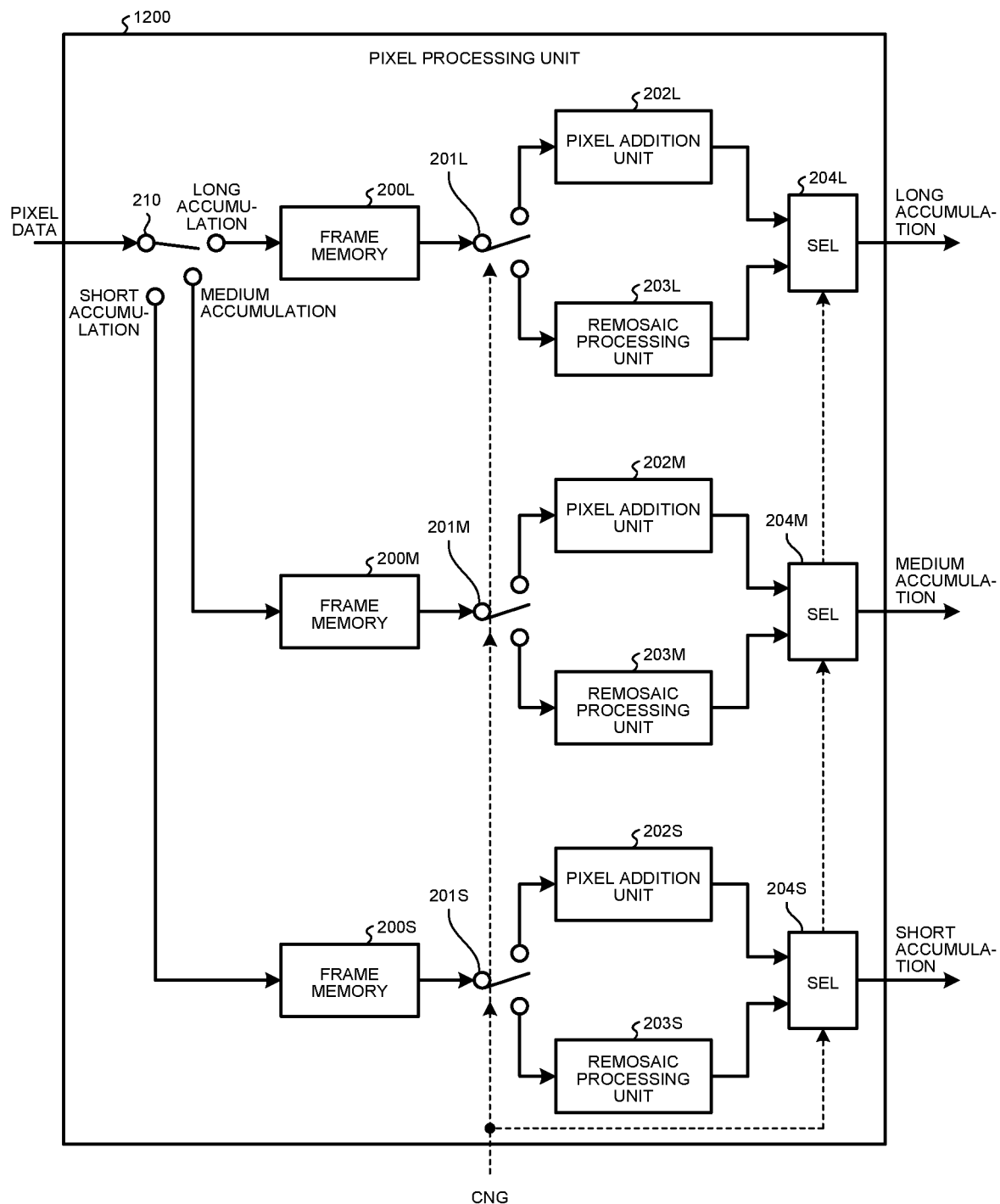
FIG. 16 is a functional block diagram of an example for describing functions of a pixel processing unit according to the first embodiment.

FIG. 16 is a functional block diagram of an example for describing functions of the pixel processing unit 1200 according to the first embodiment. In the example of FIG. 16, the pixel processing unit 1200 includes a pixel switching switch 210, frame memories 200L, 200M, and 200S, processing switching switches 201L, 201M, and 201S, pixel addition units 202L, 202M, and 202S, remosaic processing units 203L, 203M, and 203S, and selectors 204L, 204M, and 204 selector.

Among them, the frame memory 200L, the processing switching switch 201L, the pixel addition unit 202L, the remosaic processing unit 203L, and the selector 204 are components related to processing for the long-accumulation pixel data. Similarly, the frame memory 200M, the processing switching switch 201M, the pixel addition unit 202M, the remosaic processing unit 203M, and the selector 204M are components related to processing for the medium-accumulation pixel data, and the frame memory 200S, the processing switching switch 201S, the pixel addition unit 202S, the remosaic processing unit 203S, and the selector 204 selector are components related to processing for the short-accumulation pixel data.

The pixel data output from the imaging unit 10 is input to the pixel switching switch 210. The pixel switching switch 210 performs switching between first, second, and third output terminals according to a control signal (not illustrated) supplied from the control unit 14, for example. Here, for selection of the components related to the long accumulation, the first output terminal is connected to the frame memory 200L. For selection of the components related to the medium accumulation, the second output terminal is connected to the frame memory 200M. Further, for selection of the components related to the short accumulation, the third output terminal is connected to the frame memory 200S.

More specifically, for example, the control unit 14 switches an output destination of the pixel switching switch 210 to an output terminal corresponding to reading among the first, second, and third output terminals in synchronization with a read timing of each of the long accumulation, the medium accumulation, and the short accumulation in the imaging unit 10. The pixel switching switch 210 performs switching between the first, second, and third output terminals for each line at a timing corresponding to each of times $t_1$, $t_2$, and $t_3$ illustrated in FIG. 12, for example.

An operation of the pixel processing unit 1200 will be described by taking processing related to the long-accumulation pixel data as an example. When the pixel switching switch 210 is switched to the first output terminal, long-accumulation pixel data for one line is written in the frame memory 200L. The processing switching switch 201L switches a supply destination of pixel data read from the frame memory 200L to either the pixel addition unit 202L or the remosaic processing unit 203L according to the switching control signal CNG supplied from the control unit 14.

Note that, among the respective components related to the medium accumulation and the short accumulation, the processing switching switch 201M is switched to any one of the pixel addition unit 202M and the remosaic processing unit 203M and the processing switching switch 201M is switched to any one of the pixel addition unit 202S and the remosaic processing unit 203S, in synchronization with the processing switching switch 201L according to the switching control signal CNG.

First, a case where pixel data corresponding to one frame is written in the frame memory 200L and the processing switching switch 201L is switched to the first output terminal will be described. In this case, the pixel addition unit 202L reads the pixel data from the frame memory 200L in units of pixel groups via the pixel switching switch 210, and adds a pixel value based on each read pixel data for each pixel group. The pixel addition unit 202L outputs pixel data corresponding to one frame based on the pixel values added for each pixel group as image data in the addition mode. The image data in the addition mode output from the pixel addition unit 202L is supplied to a first input terminal of the selector 204L.

Next, a case where pixel data corresponding to one frame is written in the frame memory 200L and the processing switching switch 201L is switched to the first output terminal will be described. In this case, the remosaic processing unit 203L reads the pixel data from the frame memory 200L in units of processing of the remosaic processing (for example, 6×6 pixels), and performs the remosaic processing as described above on the basis of each read pixel data. The remosaic processing unit 203L outputs each of pixel data corresponding to one frame subjected to the remosaic processing as image data in the individual mode. The image data in the individual mode output from the remosaic processing unit 203L is supplied to a second input terminal of the selector 204L.

As for the selectors 204L, 204M, and 204S, one of the first and second input terminals is selected in synchronization with the processing switching switch 201L, 201M, or 201S described above according to the switching control signal CNG. Each of outputs of the selectors 204L, 204M, and 204S is output from the pixel processing unit 1200 as long-accumulation image data, medium-accumulation image data, or short-accumulation image data.

Note that processings related to the medium-accumulation pixel data performed by the frame memory 200M, the processing switching switch 201M, the pixel addition unit 202M, and the remosaic processing unit 203M, and processings related to the short-accumulation pixel data performed by the frame memory 200S, the processing switching switch 201S, the pixel addition unit 202S, and the remosaic processing unit 203S are equivalent to processings performed by the frame memory 200L, the processing switching switch 201L, the pixel addition unit 202L, and the remosaic processing unit 203L described above, and thus a description thereof is omitted here.

The control unit 14 generates the switching control signal CNG for indicating which of the processing in the addition mode and the processing in the individual mode is to be performed, for example, according to a predetermined imaging condition, and supplies the switching control signal CNG to the pixel processing unit 1200. For example, the control unit 14 can apply a speed of the imaging device 1 with respect to the subject as the imaging condition for generating the switching control signal CNG. As another example, the control unit 14 can apply a brightness of the subject or a brightness of the imaging environment as the imaging condition for generating the switching control signal CNG.

A case where the imaging device 1 is mounted on a vehicle and used will be described more specifically as an example. In the imaging device 1, the vehicle information acquisition unit 15 acquires vehicle information including information regarding traveling of the vehicle from the vehicle (see FIG. 1). In the imaging device 1, the control unit 14 extracts information indicating a traveling speed from the acquired vehicle information, and compares the extracted traveling speed with a threshold value $v_{th}$. In a case where the traveling speed is equal to or higher than the threshold value $v_{th}$, the control unit 14 generates the switching control signal CNG for indicating the individual mode, and supplies the switching control signal CNG to the pixel processing unit 1200.

On the other hand, in a case where the traveling speed is lower than the threshold value $v_{th}$, the control unit 14 generates the switching control signal CNG for indicating the addition mode, and supplies the switching control signal CNG to the pixel processing unit 1200. In the addition mode, a processing amount of the pixel processing unit 1200 or each unit in the subsequent stage of the pixel processing unit 1200 is smaller than that in the individual mode, and thus, power saving can be realized.

Furthermore, the imaging device 1 acquires information (for example, a luminance value) indicating the brightness of the imaging environment on the basis of an output of this imaging device 1 or, for example, another sensor mounted on the vehicle. In the imaging device 1, the control unit 14 compares the acquired brightness with a threshold value $Y_{th}$. In a case where the brightness is equal to or higher than the threshold value $Y_{th}$, the control unit 14 generates the switching control signal CNG for indicating the individual mode, and supplies the switching control signal CNG to the pixel processing unit 1200. On the other hand, in a case where the brightness is lower than the threshold value $Y_{th}$, the control unit 14 generates the switching control signal CNG for indicating the individual mode, and supplies the switching control signal CNG to the pixel processing unit 1200.

In the above description, the control unit 14 generates the switching control signal CNG according to one imaging condition, but the number of imaging conditions is not limited thereto. The control unit 14 may generate the switching control signal CNG according to a plurality of imaging conditions.

Figure 17:
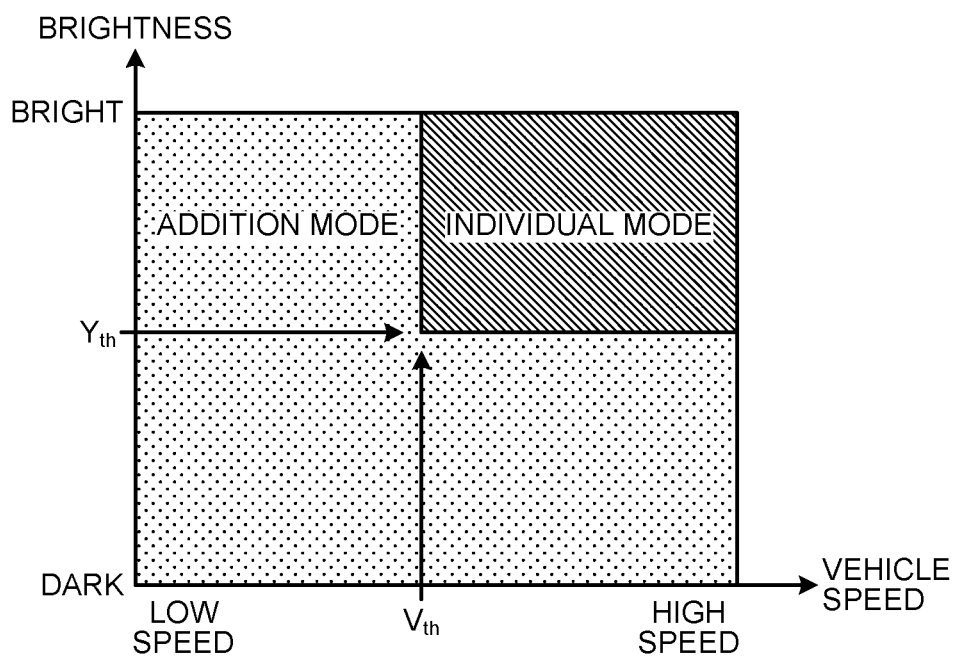
FIG. 17 is a schematic diagram for describing an example of generating a switching control signal CNG according to two imaging conditions according to the first embodiment.

FIG. 17 is a schematic diagram for describing an example of generating the switching control signal CNG according to two imaging conditions according to the first embodiment. In the example of FIG. 17, switching between the addition mode and the individual mode is performed on the basis of the traveling speed of the vehicle and the brightness of the imaging environment described above. That is, in a case where the traveling speed is equal to or higher than the threshold value $v_{th}$ and the brightness is equal to or higher than the threshold value $Y_{th}$, the control unit 14 generates the switching control signal CNG for indicating the individual mode, and supplies the switching control signal CNG to the pixel processing unit 1200. On the other hand, in a case where the traveling speed is lower than the threshold value $v_{th}$ or the brightness is lower than $Y_{th}$, the control unit 14 generates the switching control signal CNG for indicating the addition mode, and supplies the switching control signal CNG to the pixel processing unit 1200.

The switching control signal CNG for indicating the individual mode and the switching control signal CNG for indicating the addition mode are generated on the basis of the imaging condition in this manner, such that the performance of sensing based on the captured image can be optimized. Furthermore, the switching control signal CNG is generated on the basis of a plurality of imaging conditions, such that a more detailed control can be performed.

Note that, in the individual mode, quadruple processing is required for pixel data as compared with that in the addition mode. At this time, it is conceivable that a region to be subjected to reading from the imaging unit 10 in the individual mode and image processing is reduced to, for example, ½ both horizontally and vertically. As a result, power saving can be achieved, and consumption of calculation resources in the image processing unit 12 can be suppressed.

In the above description, it has been described that the imaging method applied to the first embodiment is the rolling shutter method, but the imaging method is not limited thereto. That is, a global shutter method, which is an imaging method in which exposure is simultaneously performed in all lines, can also be applied to the first embodiment.

Furthermore, in the above description, each of the long-accumulation pixel data, the medium-accumulation pixel data, and the short-accumulation pixel data subjected to the remosaic processing in the pixel processing unit 1200 is supplied to the HDR combination processing unit 1201, but the present disclosure is not limited to this example. For example, the remosaic processing can be performed by the pixel processing unit 1200 after the HDR combination processing performed by the HDR combination processing unit 1201. More specifically, the HDR combination processing is performed on each of the long-accumulation pixel data, the medium-accumulation pixel data, and the short-accumulation pixel data output from the imaging unit 10, and the remosaic processing is performed on, for example, the pixel data corresponding to one frame subjected to the HDR combination processing.

2-1. First Modified Example of First Embodiment

Next, a first modified example of the first embodiment will be described. In the first embodiment described above, the reading processing in one of the addition mode and the individual mode is performed on an entire frame. On the other hand, in the first modified example of the first embodiment, a processing region to be subjected to processing in the individual mode and a processing region to be subjected to processing in the addition mode are set in a frame.

Figure 18A:
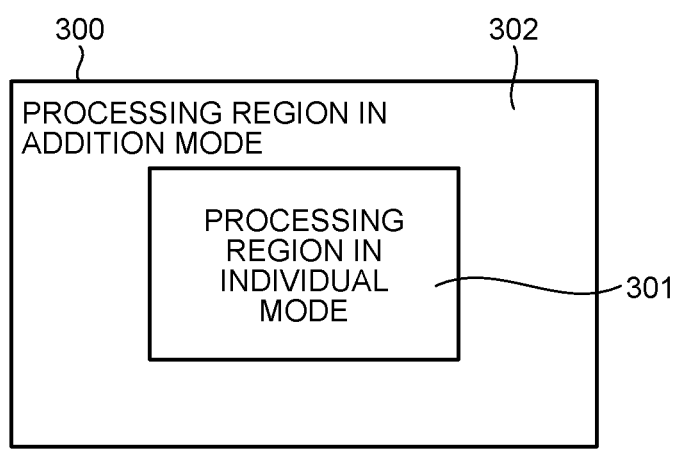
FIG. 18A is a schematic diagram for describing processing regions according to a first modified example of the first embodiment.
Figure 18B:
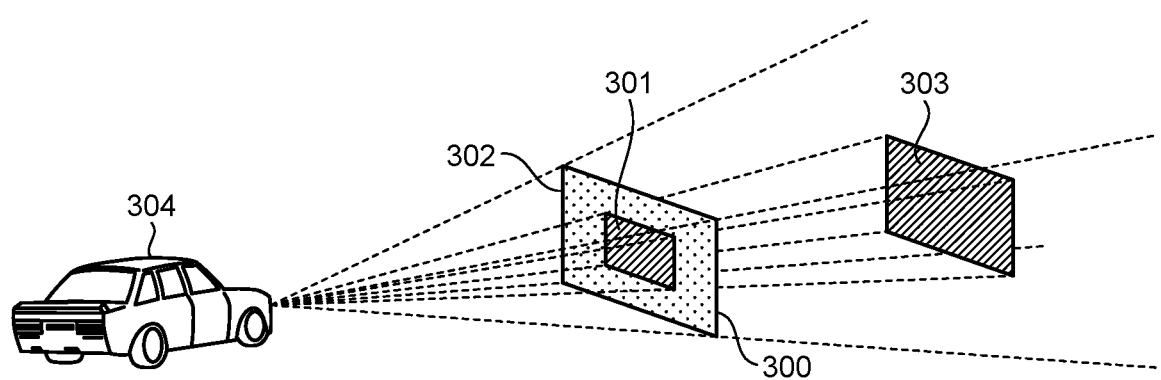
FIG. 18B is a schematic diagram for describing the processing regions according to the first modified example of the first embodiment.

FIGS. 18A and 18B are schematic diagrams for describing the processing regions according to the first modified example of the first embodiment. As illustrated in FIG. 18A, in the first modified example of the first embodiment, for example, a first processing region 301 to be subjected to the processing in the individual mode is set at a central portion of a frame 300, and a region (a peripheral portion of the frame 300) other than the first processing region 301 in the frame 300 is set as a second processing region 302 to be subjected to the processing in the addition mode. For example, it is conceivable that sizes of the first processing region 301 in the horizontal and vertical directions are ½ of sizes of the frame 300 in the horizontal and vertical directions.

As illustrated in FIG. 18B, for example, when viewed from a vehicle 304 on which an imaging device 1 according to the first modified example of the first embodiment is mounted, the first processing region 301 at the central portion of the frame 300 includes an image of a gaze region 303 that is positioned farther in a traveling direction of the vehicle 304 and that a driver of the vehicle needs to gaze at, for example. Therefore, it is preferable that the first processing region 301 performs image processing in the individual mode at a higher resolution. On the other hand, the second processing region 302 outside the first processing region 301 performs image processing in the addition mode at a resolution lower than that of the first processing region 301.

As described above, in the first modified example of the first embodiment, the switching control signal CNG is generated according to a region in the frame as the imaging condition. By separately setting the individual mode and the addition mode for the central portion and the peripheral portion of the frame 300, respectively, it is possible to save power while including necessary information in the output image.

Figure 19:
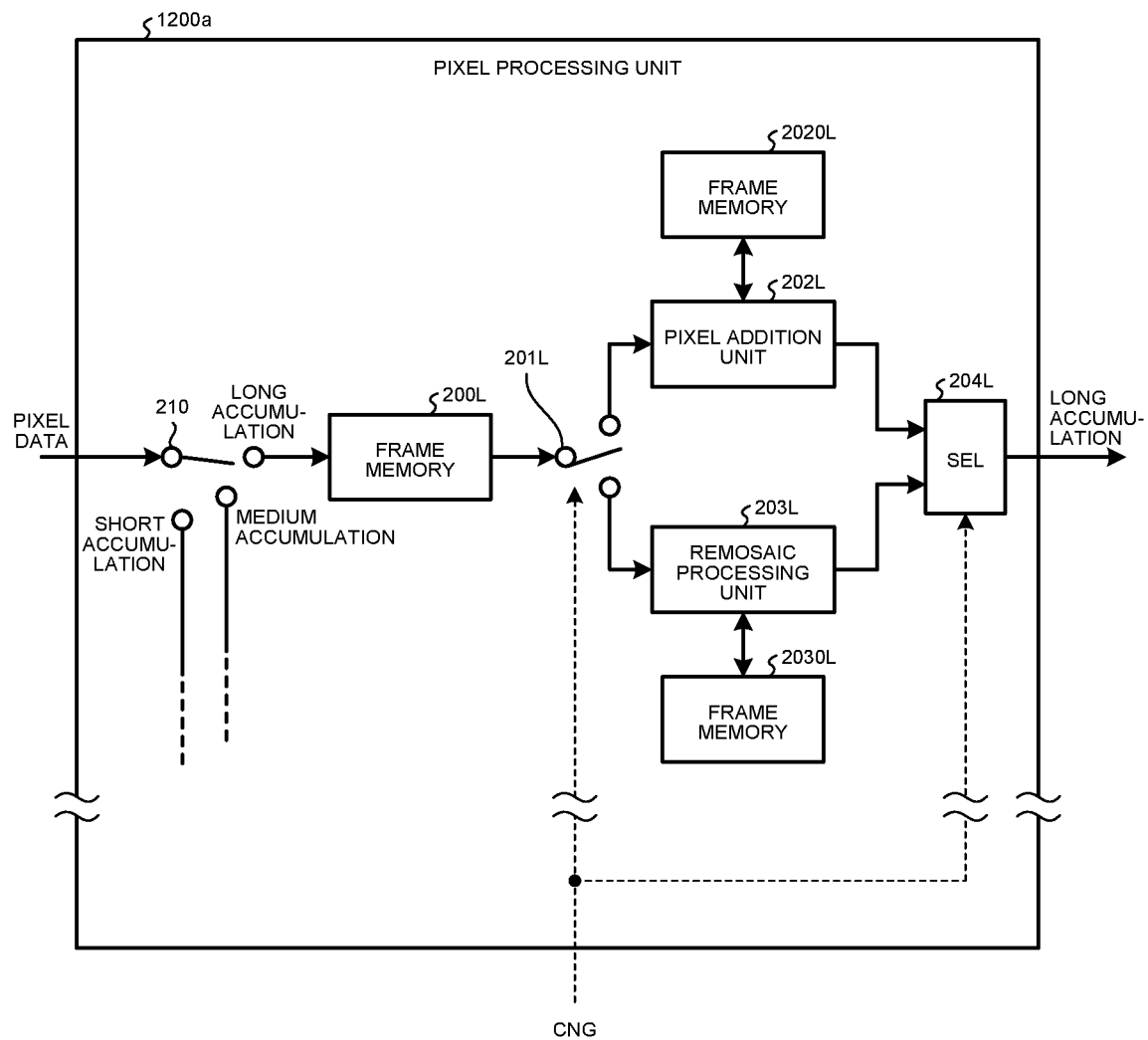
FIG. 19 is a functional block diagram of an example for describing functions of an image processing unit applicable to the first modified example of the first embodiment.

FIG. 19 is a functional block diagram of an example for describing functions of a pixel processing unit 1200a applicable to the first modified example of the first embodiment. Note that FIG. 19 is a diagram corresponding to FIG. 16 described above, and illustrates only components related to the long accumulation, and components related to the medium accumulation and the short accumulation are omitted.

In the pixel processing unit 1200a illustrated in FIG. 19, a frame memory 2020L connected to a pixel addition unit 202L and a frame memory 2030L connected to a remosaic processing unit 203L are added to the pixel processing unit 1200 illustrated in FIG. 16 described above.

A control unit 14 performs a control so that the processing in the individual mode is performed on the first processing region 301 and the processing in the addition mode is performed on the second processing region 302 by switching the switching control signal CNG at a boundary between the first processing region 301 and the second processing region 302.

As a more specific example, the control unit 14 supplies the switching control signal CNG to the pixel processing unit 1200 in order of line, and supplies the switching control signal CNG to the pixel processing unit 1200 for a region from the left end to the right end of the frame 300 for each line.

The control unit 14 generates the switching control signal CNG for indicating the addition mode from a line at the upper end of the frame 300 to a line immediately before the upper end of the first processing region 301, and supplies the switching control signal CNG to the pixel processing unit 1200. For the lines from the upper end to the lower end of the first processing region 301, the control unit 14 generates the switching control signal CNG for indicating the addition mode for a region from the left end of the frame 300 to immediately before the left end of the first processing region 301 for each line and supplies the switching control signal CNG to the pixel processing unit 1200. The control unit 14 generates the switching control signal CNG for indicating the individual mode for a region from the left end to the right end of the first processing region 301, and supplies the switching control signal CNG to the pixel processing unit 1200. The control unit 14 generates the switching control signal CNG for indicating the addition mode for a region from immediately after the right end of the first processing region 301 to the right end of the frame 300, and supplies the switching control signal CNG to the pixel processing unit 1200. Furthermore, the control unit 14 generates the switching control signal CNG for indicating the addition mode for a region from a line immediately after the lower end of the first processing region 301 to a line at the lower end of the frame 300, and supplies the switching control signal CNG to the pixel processing unit 1200.

While the switching control signal CNG for indicating the addition mode is supplied, the pixel addition unit 202L reads pixel data corresponding to the second processing region 302 from a frame memory 200L in order of line, for example, and writes the read pixel data in the frame memory 2020L. At this time, the pixel addition unit 202L skips, for example, pixel data inside the first processing region 301 in a line including the first processing region 301. The pixel addition unit 202L performs the addition processing on the pixel data written in the frame memory 2020L in units of pixel groups, and updates the frame memory 2020L with a pixel value of the addition processing result.

Similarly, while the switching control signal CNG for indicating the individual mode is supplied, the remosaic processing unit 203L reads pixel data corresponding to the first processing region 301 from the frame memory 200L and writes the read pixel data in the frame memory 2030L. At this time, since peripheral pixels corresponding to several pixels are used for a pixel of interest in the remosaic processing, the remosaic processing unit 203L reads pixel data from the frame memory 200L in consideration of the peripheral pixels. The remosaic processing unit 203L performs the remosaic processing by using the pixel data written in the frame memory 2030L, and updates the frame memory 2030L with a pixel value of the remosaic processing result.

The pieces of pixel data that have been subjected to the addition processing performed by the pixel addition unit 202L and the remosaic processing performed by the remosaic processing unit 203L and have been written in the frame memories 2020L and 2030L, respectively, are combined by being output via a selector 204L whose first and second input terminals are switched according to the switching control signal CNG, and are output as a long-accumulation frame image.

2-2. Second Modified Example of First Embodiment

Next, a second modified example of the first embodiment will be described. In the first modified example of the first embodiment described above, the processing region to be subjected to the processing in the individual mode and the processing region to be subjected to the processing in the addition mode are fixedly set. On the other hand, in the second modified example of the first embodiment, the processing region to be subjected to the processing in the individual mode and the processing region to be subjected to the processing in the addition mode are adaptively set.

Figure 20:
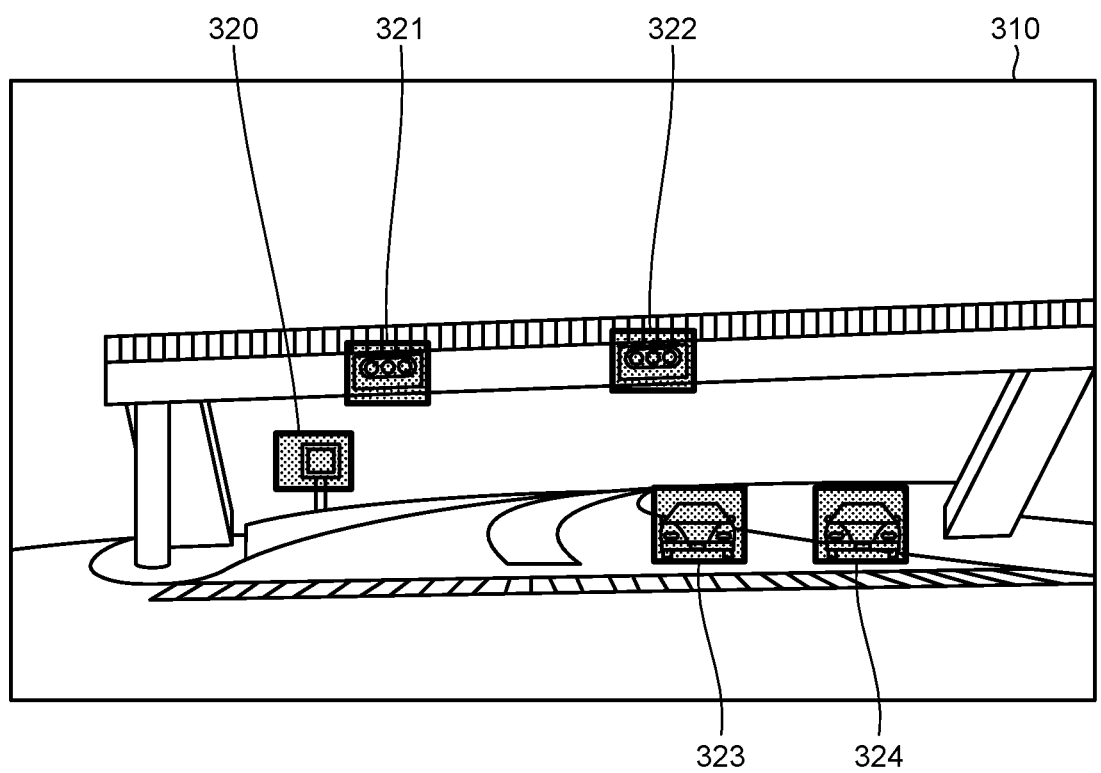
FIG. 20 is a schematic diagram for describing a processing region according to a second modified example of the first embodiment.

FIG. 20 is a schematic diagram for describing processing regions according to the second modified example of the first embodiment. In the second modified example of the first embodiment, a specific object included in an image based on pixel data read from the imaging unit 10 is detected, and a processing region to be subjected to the processing in the individual mode and a processing region subjected to the processing in the addition mode are set on the basis of the detected specific object.

In the example of FIG. 20, two traffic lights, a sign, and two oncoming vehicles are detected as specific objects from an image 310 based on pixel data read from the imaging unit 10. Examples of the specific object include a pedestrian walking on a road. A region 320 including the detected sign, regions 321 and 322 respectively including the detected two traffic lights, and regions 323 and 324 respectively including the detected two oncoming vehicles are processing regions to be subjected to the processing in the individual mode, and regions other than these regions 320 to 324 in the image 310 are processing regions to be subjected to the processing in the addition mode.

As described above, in the second modified example of the first embodiment, the switching control signal CNG is generated by using an object included in an image of a frame and a region including the object as the imaging condition. For example, processing in the individual mode is performed on a region including an object important for traveling of the vehicle to generate a high-resolution image. On the other hand, for example, processing in the addition mode is performed on a region that is less important for traveling of the vehicle to generate an image with a lower resolution than that in a case of the individual mode. As a result, it becomes easy to recognize an object important for traveling of the vehicle, and traveling safety can be improved. In addition, the processing in the addition mode is inferior to the individual mode in terms of the resolution of the generated image, but a processing load is smaller than that in the individual mode. As a result, it is possible to suppress calculation resources and power consumption as a whole.

Figure 21:
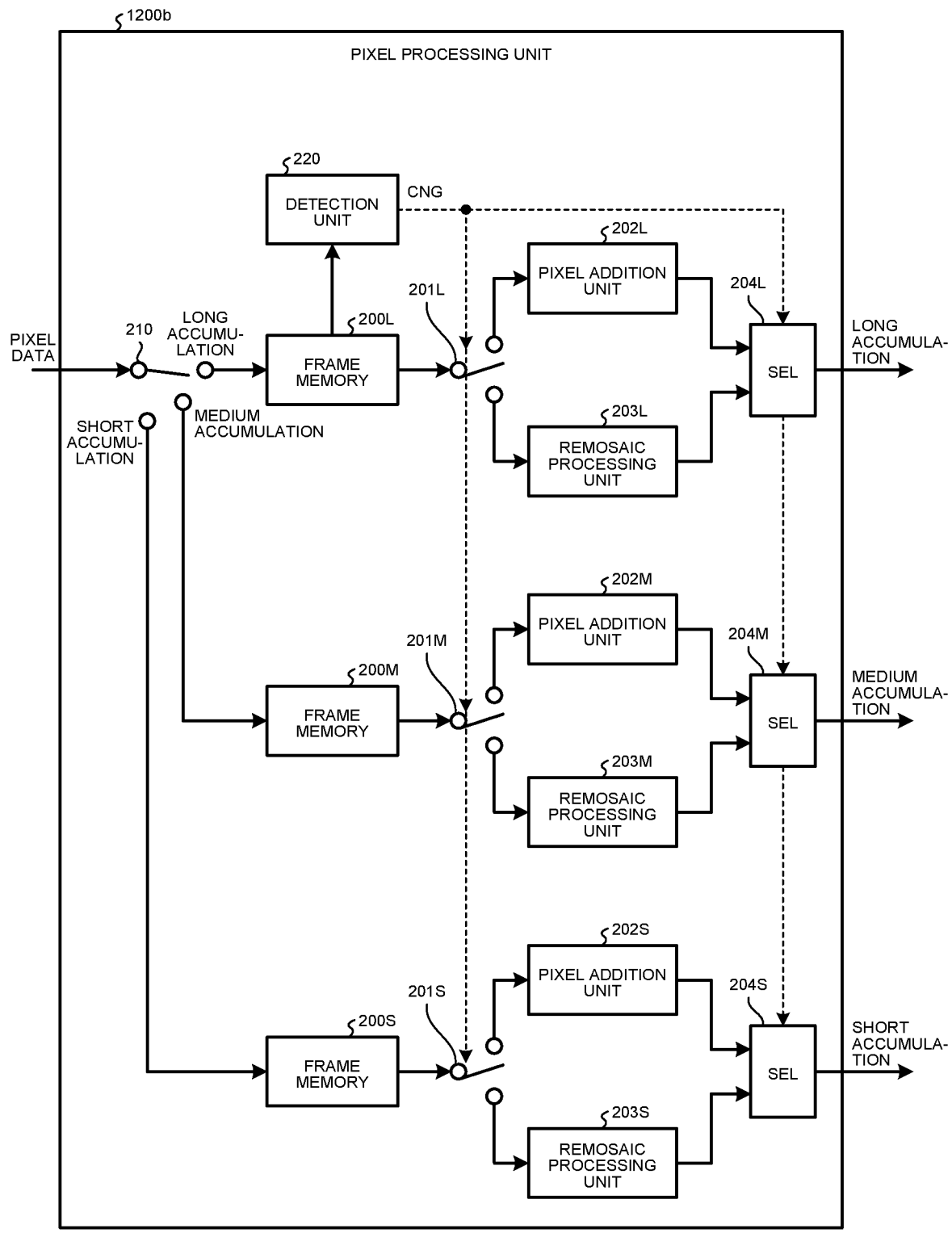
FIG. 21 is a functional block diagram of an example for describing functions of an image processing unit applicable to the second modified example of the first embodiment.

FIG. 21 is a functional block diagram of an example for describing functions of a pixel processing unit 1200b applicable to the second modified example of the first embodiment. Note that the pixel processing unit 1200b illustrated in FIG. 19 is configured so that a detection unit 220 is added to the above-described configuration of FIG. 16, and processing switching switches 201L, 201M, and 201S and selectors 204L, 204M, and 204S are switched according to the switching control signal CNG output from the detection unit 220.

More specifically, the detection unit 220 detects a specific object included in an image based on image data of one frame based on pixel data written in a frame memory 200L, for example. The detection unit 220 can detect an object by, for example, pattern recognition based on a pattern registered in advance. The present disclosure is not limited thereto, and the detection unit 220 may recognize an object by machine learning processing using a learning model trained in advance by using predetermined teacher data.

Note that a switching control of the processing switching switches 201L, 201M, and 201S and the selectors 204L, 204M, and 204S according to the switching control signal CNG is similar to the control described with reference to FIG. 19 in the first modified example of the first embodiment described above, and thus a description thereof is omitted here.

Furthermore, here, it has been described that the detection unit 220 detects the specific object on the basis of the image data of the frame memory 200L, but the present disclosure is not limited to this example. For example, the detection unit 220 may detect the specific object on the basis of image data written in at least one of the frame memories 200L, 200M, and 200S. Furthermore, in FIG. 21, the pixel processing unit 1200b is illustrated as having the function of the detection unit 220, but the present disclosure is not limited to this example. For example, a control unit 14 may have the function of the detection unit 220.

2-3. Third Modified Example of First Embodiment

Next, a third modified example of the first embodiment will be described. In the first embodiment and the first and second modified examples of the first embodiment described above, it has been described that the pixel arrangement in the imaging unit 10 is the Quad Bayer RGB arrangement, but the pixel arrangement applicable to the present disclosure is not limited to the Quad Bayer RGB arrangement. That is, the present disclosure is also applicable to a pixel arrangement other than the Quad Bayer RGB arrangement as long as the pixel arrangement is a pixel arrangement in which optical filters that transmit light in the same wavelength band are arranged on 2×2 pixels.

Figures 22A, 22B, 22C:
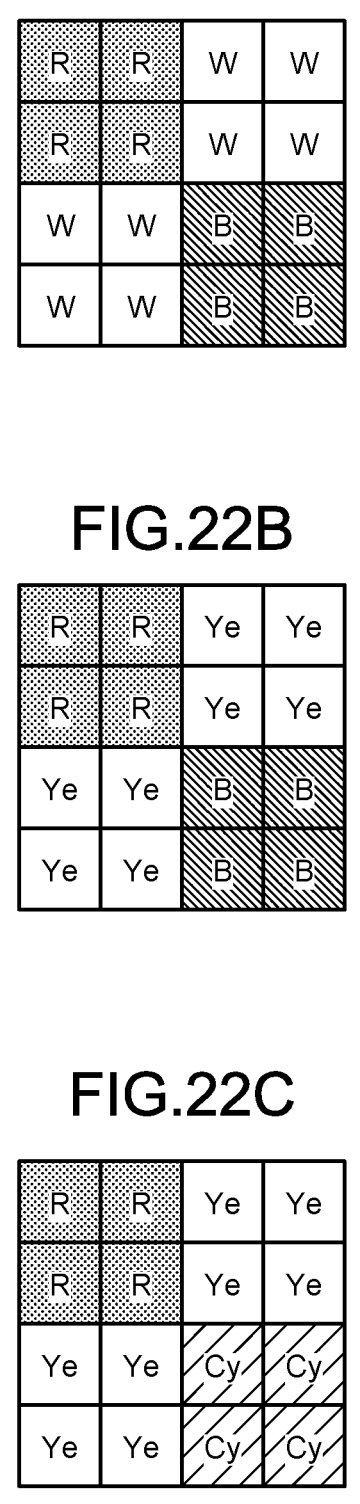

FIGS. 22A to 22E are schematic diagrams illustrating examples of pixel arrangements applicable to the present disclosure. FIG. 22A illustrates an example of a pixel arrangement in which a pixel W on which a filter that transmits light in an entire visible light range is provided is arranged instead of the pixel G in the Quad Bayer RGB arrangement. FIG. 22B illustrates an example of a pixel arrangement in which a pixel Ye on which a yellow color filter is provided is arranged instead of the pixels G in the Quad Bayer RGB arrangement. Furthermore, FIG. 22C illustrates an example of a pixel arrangement in which a pixel Cy on which a cyan color filter is provided is further arranged instead of the pixel B in the pixel arrangement of FIG. 22B.

With the pixel arrangements illustrated in FIGS. 22A, 22B, and 22C, it is possible to obtain higher sensitivity as compared with the Quad Bayer RGB arrangement. In addition, the pixel arrangements illustrated in FIGS. 22B and 22C including the pixel Ye has a characteristic of being hardly affected by a lens aberration. On the other hand, all of the pixel arrangements of FIGS. 22A to 22C do not include the G (green) color among three primary colors in additive mixing, and thus, full color reproduction cannot be made. Therefore, the respective pixel arrangements illustrated in FIGS. 22A to 22C are suitable for sensing.

Figures 22D, 22E:
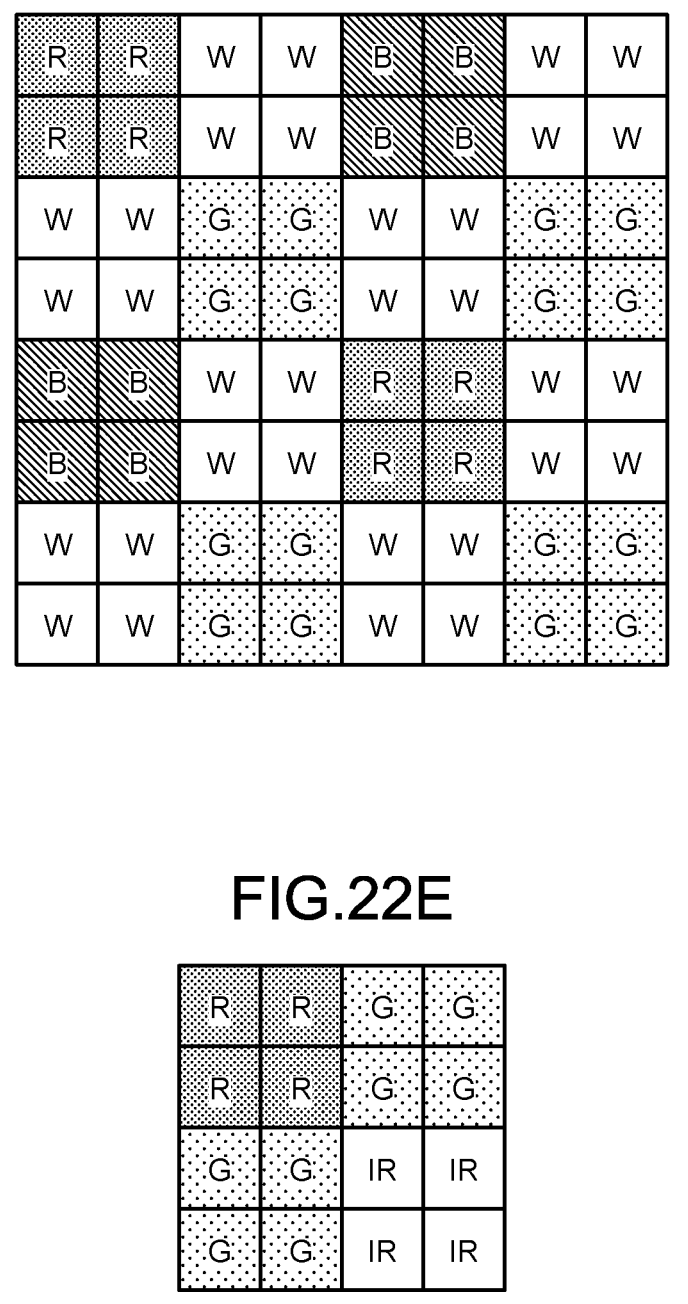

FIG. 22D illustrates an example of a pixel arrangement in which pixel groups of 2×2 pixels are arranged in four columns×four rows. In the pixel arrangement illustrated in FIG. 22D, two pixel groups of the pixels R, two pixel groups of the pixels B, four pixel groups of the pixels G, and eight pixel groups of the pixels W are arranged so that the pixel groups of the pixels of the same color are not adjacent to each other. In the pixel arrangement of FIG. 22D, high sensitivity can be obtained by the eight pixel groups of the pixels W, and full color reproduction can be achieved by the pixel groups of the pixels R, G, and B arranged at a ratio of 1:2:1. On the other hand, for example, since an interval between the pixel groups of the respective colors is larger than that of the Quad Bayer RGB arrangement, it is disadvantageous in terms of resolution.

FIG. 22E is an example of a pixel arrangement including a pixel IR on which an infrared (IR) filter that transmits light in an infrared range is provided. Distance measurement or the like using reflection of infrared light can be performed by using the pixel IR. The example of FIG. 22E is an example in which the pixel IR is arranged instead of the pixel B in the Quad Bayer RGB arrangement. Note that, in FIG. 22E, all of four pixels B included in a pixel group of the pixels B in the Quad Bayer RGB arrangement are replaced with the pixels IR, but the present disclosure is not limited thereto. For example, a pixel arrangement in which one to three pixels among four pixels included in a pixel group of the pixels B (alternatively, the pixels R or the pixels G) are replaced with the pixels IR may be used.

The pixel arrangement illustrated in FIG. 22E can be used in combination with, for example, the Quad Bayer RGB arrangement. For example, it is conceivable to insert the pixel arrangement of FIG. 22E at predetermined intervals into the Quad Bayer RGB arrangement repeatedly arranged corresponding to frames. Furthermore, it is also conceivable to arrange a predetermined number of pixel arrangements of FIG. 22E for the Quad Bayer RGB arrangement repeatedly arranged corresponding to frames.

3. Second Embodiment

Next, a second embodiment of the present disclosure will be described. In the first embodiment and the modified examples thereof described above, the addition processing of adding pixel values of respective pixels included in a pixel group in the addition mode is performed in the image processing unit 12. The present disclosure is not limited thereto, and the addition processing can be performed inside each pixel array unit 110 in the imaging unit 10.

Figure 23A:
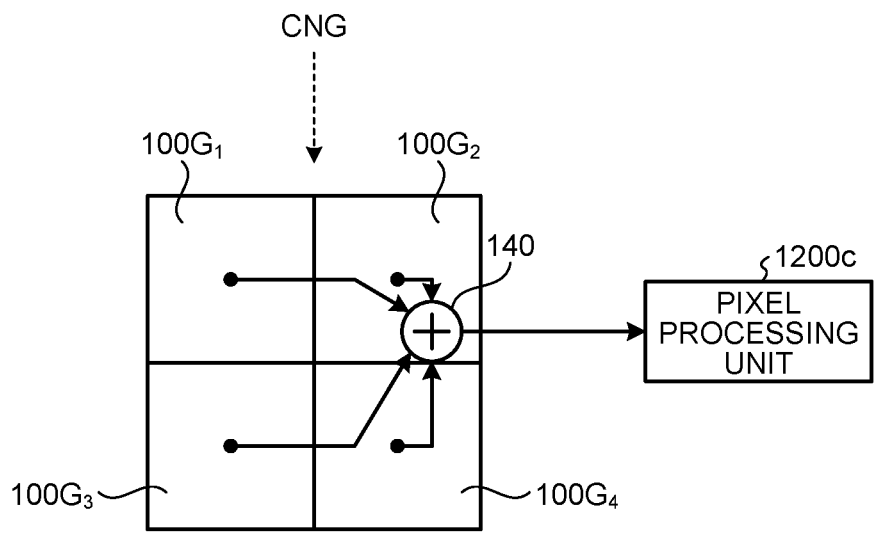
FIG. 23A is a schematic diagram for describing an example of a method of switching between an individual mode and an addition mode in a pixel group according to a second embodiment.
Figure 23B:
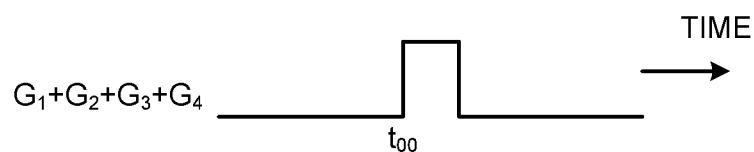
FIG. 23B is a schematic diagram for describing the example of the method of switching between the individual mode and the addition mode in the pixel group according to the second embodiment.
Figure 23C:
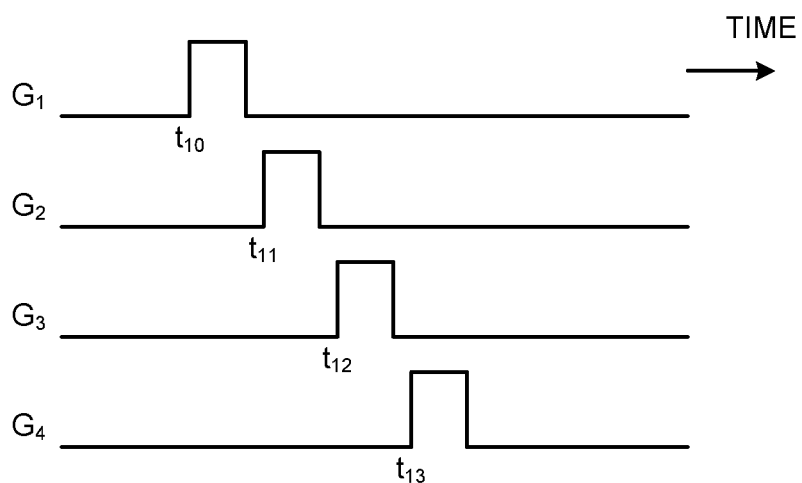
FIG. 23C is a schematic diagram for describing the example of the method of switching between the individual mode and the addition mode in the pixel group according to the second embodiment.

FIGS. 23A, 23B, and 23C are schematic diagrams for describing an example of a method of switching between the individual mode and the addition mode in a pixel group according to the second embodiment.

FIG. 23A is a schematic diagram for describing a method of reading a signal from each pixel 100 included in a pixel block according to the second embodiment. Here, a pixel block of pixels G will be described as an example. As illustrated in FIG. 23A, pixels $100G_1$, $100G_2$, $100G_3$, and $100G_4$ included in the pixel block share one floating diffusion layer.

First, an example of a reading method in a case where the addition mode is indicated by a switching control signal CNG will be described with reference to a time chart of FIG. 23B. Note that, in FIG. 23B and FIG. 23C to be described later, the time increases to the right, and the pixels $100G_1$ to $100G_4$ are illustrated as pixels $G_1$, $G_2$, $G_3$, and $G_4$, respectively.

In the addition mode, electric charges accumulated in respective light receiving elements in the pixels $100G_1$, $100G_2$, $100G_3$, and $100G_4$ included in the pixel group are added and read inside the pixel block.

For example, under the control of a control unit 22, a vertical scanning unit 20 resets the floating diffusion layer for the pixel block at a time t00 in FIG. 23B, then reads the electric charges from the respective light receiving elements in the pixels $100G_1$ to $100G_4$, and transfers the read electric charges to the floating diffusion layer. In the floating diffusion layer, the electric charges transferred from the respective light receiving elements are added in an addition unit 140. In this case, the addition unit 140 corresponds to the floating diffusion layer common to the pixels 100G1 to $100G_4$. In the floating diffusion layer, the electric charges transferred from the respective light receiving elements and added are converted into a voltage according to the amount of the electric charges, and the voltage is output to a vertical signal line VSL as a total pixel signal of the respective pixels $100G_1$ to $100G_4$.

The total pixel signal of the respective pixels $100G_1$ to $100G_4$ is converted into pixel data by an AD converter included in a horizontal scanning unit 21 and supplied to a pixel processing unit 1200c.

Next, an example of a reading method in a case where the individual mode is indicated by the switching control signal CNG will be described with reference to a time chart of FIG. 23C.

For example, under the control of the control unit 22, the vertical scanning unit 20 resets the floating diffusion layer for the pixel block at a time $t_{10}$ in FIG. 23C, then reads the electric charge from the light receiving element in the pixel $100G_1$, and transfers the read electric charge to the floating diffusion layer. In the floating diffusion layer, the transferred electric charge is converted into a voltage corresponding to the amount of the electric charge, and the voltage is output to the vertical signal line VSL as a pixel signal read from the pixel $100G_1$. Note that the addition processing performed by the addition unit 140 is not performed.

Next, the vertical scanning unit 20 resets the floating diffusion layer for the pixel block at a time $t_{11}$ in FIG. 23C, then reads the electric charge from the light receiving element in the pixel $100G_2$, and transfers the read electric charge to the floating diffusion layer. In the floating diffusion layer, the transferred electric charge is converted into a voltage corresponding to the amount of the electric charge, and the voltage is output to the vertical signal line VSL as a pixel signal read from the pixel $100G_2$. Note that the addition processing performed by the addition unit 140 is not performed.

Similarly, in reading of pixel signals from the pixels $100G_3$ and $100G_4$, the vertical scanning unit 20 resets the floating diffusion layer, and then reads the electric charges from the light receiving elements, and transfers the read electric charges to the floating diffusion layer (times $t_{12}$ and $t_{13}$ in FIG. 23C). Note that the addition processing performed by the addition unit 140 is not performed for each of them.

Each pixel signal read from each of the pixels $100G_1$ to $100G^4$ is converted into pixel data by the AD converter included in the horizontal scanning unit 21 and supplied to the pixel processing unit 1200c.

Figure 24:
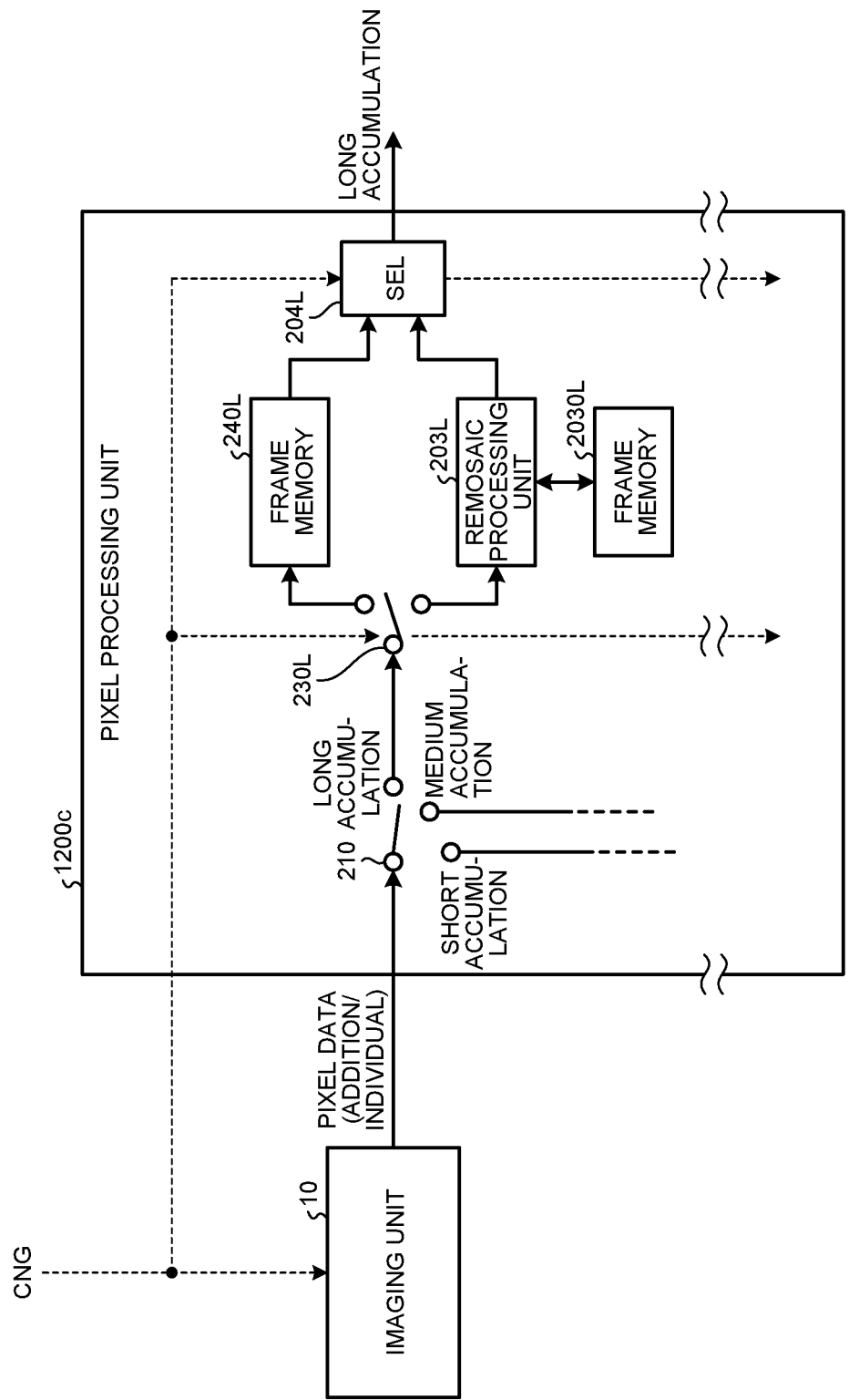
FIG. 24 is a functional block diagram of an example for describing functions of an image processing unit applicable to the second embodiment.

FIG. 24 is a functional block diagram of an example for describing functions of the pixel processing unit 1200c applicable to the second embodiment. Note that FIG. 24 is a diagram corresponding to FIG. 16 described above, and illustrates only components related to the long accumulation, and components related to the medium accumulation and the short accumulation are omitted.

In the pixel processing unit 1200c illustrated in FIG. 24, a frame memory 240L is provided instead of the pixel addition unit 202L of the pixel processing unit 1200 illustrated in FIG. 16 described above. Furthermore, in a case where pixel data is output from an imaging unit 10 in the addition mode, a processing switching switch 230L switches an output destination of the pixel data to the frame memory 240L according to the switching control signal CNG. The pixel data output from the imaging unit 10 is written in the frame memory 240L.

On the other hand, in a case where the pixel data is output from the imaging unit 10 in the individual mode, the output destination of the pixel data is switched to a remosaic processing unit 203L. The pixel data output from the imaging unit 10 is supplied to the remosaic processing unit 203L and written in a frame memory 2030L. The remosaic processing unit 203L performs remosaic processing on the basis of the pixel data written in the frame memory 2030L, and updates, for example, the frame memory 2030L with the pixel data subjected to the remosaic processing.

As described above, by performing the addition processing for the pixel value in the addition mode inside each pixel array unit 110 in the imaging unit 10, a configuration of an image processing unit 12 (pixel processing unit 1200c) can be simplified.

3-1. Modified Example of Second Embodiment

Next, a modified example of the second embodiment will be described. In the modified example of the second embodiment, a processing region to be subjected to processing in the individual mode and a processing region to be subjected to processing in the addition mode can be set in a frame in the configuration in which the addition processing of adding a pixel value in the addition mode can be performed inside each pixel array unit 110 in the imaging unit 10.

Figure 25:
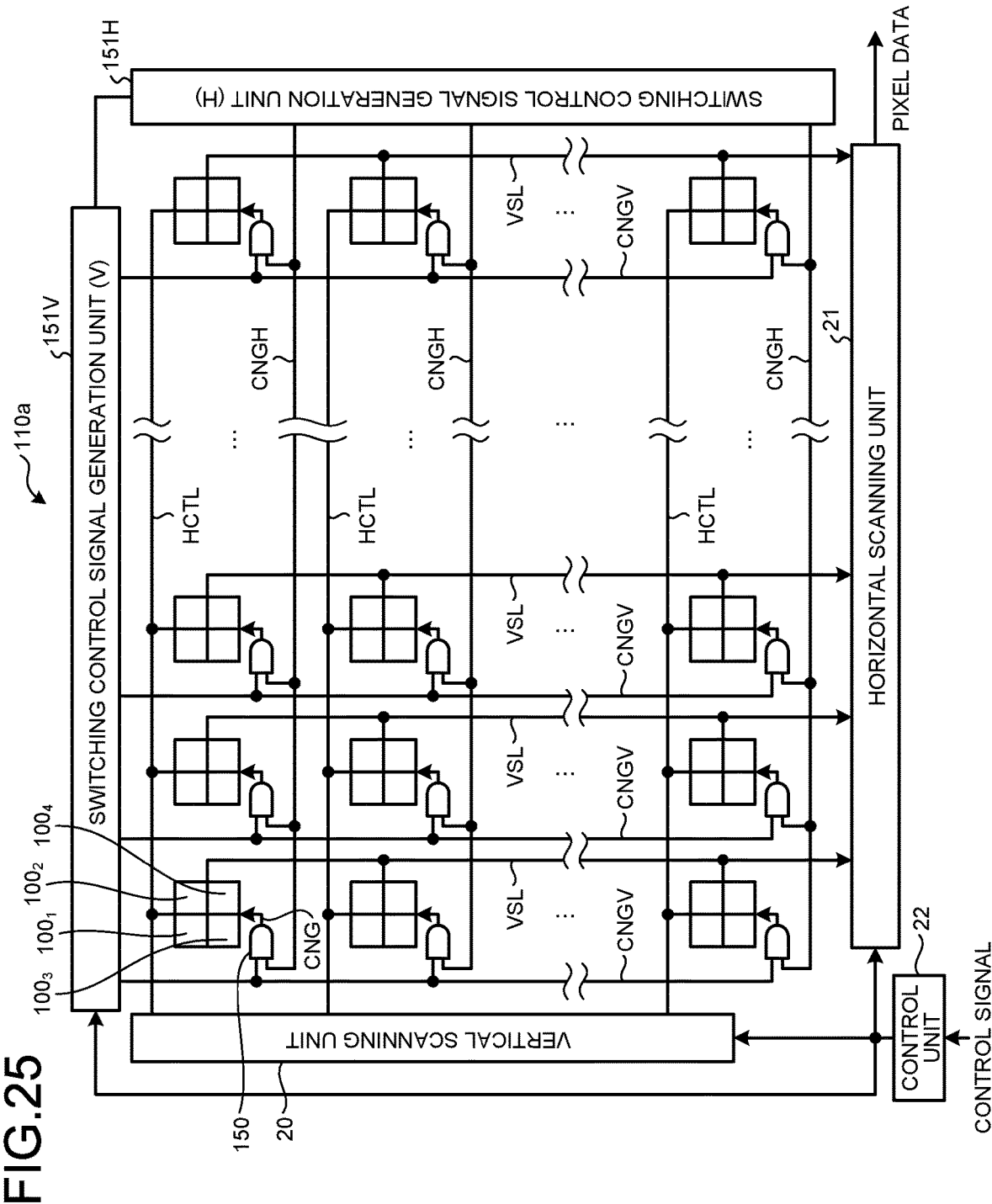
FIG. 25 is a block diagram illustrating a configuration of an example of an imaging unit according to a modified example of the second embodiment.

FIG. 25 is a block diagram illustrating a configuration of an example of an imaging unit 10 according to the modified example of the second embodiment. In FIG. 25, in a pixel array unit 110a, a switching control signal generation unit (V) 151V and a switching control signal generation unit (H)

151H are added to the pixel array unit 110 described in FIG. 4. Furthermore, in FIG. 25, pixels are grouped into each pixel group including four pixels including pixels 1001, 1002, 1003, and 1004. Furthermore, an AND circuit 150 is provided for each pixel group.

Note that, although FIG. 25 illustrates that each pixel group is connected to the vertical signal line VSL, in actual implementation, each of the pixels 1001, 1002, 1003, and 1004 of each pixel group is connected to the vertical signal line VSL.

The switching control signal generation unit (V) 151V generates a switching control signal CNGV for indicating the addition mode and the individual mode for each column of respectively pixel groups included in the pixel array unit 110a on the basis of a control signal supplied from the control unit 22, for example. Further, the switching control signal generation unit (H) 151H generates a switching control signal CNGH for indicating the addition mode and the individual mode for each row of respectively pixel groups included in the pixel array unit 110a on the basis of a control signal supplied from the control unit 22, for example.

For each pixel group, the switching control signal CNGV is input to one input terminal of the AND circuit, and the switching control signal CNGH is input to the other input terminal. In the AND circuit 150, a logical product of the switching control signals CNGV and CNGH is obtained. The AND circuit 150 outputs a result of the logical product of the switching control signals CNGV and CNGH as the switching control signal CNG, and supplies the switching control signal CNG to the pixel group including the AND circuit 150.

With such a configuration of the pixel array unit 110a, similar to the first and second modified examples of the first embodiment described above, reading in the addition mode and reading in the individual mode for each pixel group included in the pixel array unit 110a can be switched and indicated for a rectangular region including one or more pixel groups.

4. Third Embodiment

Figure 26:
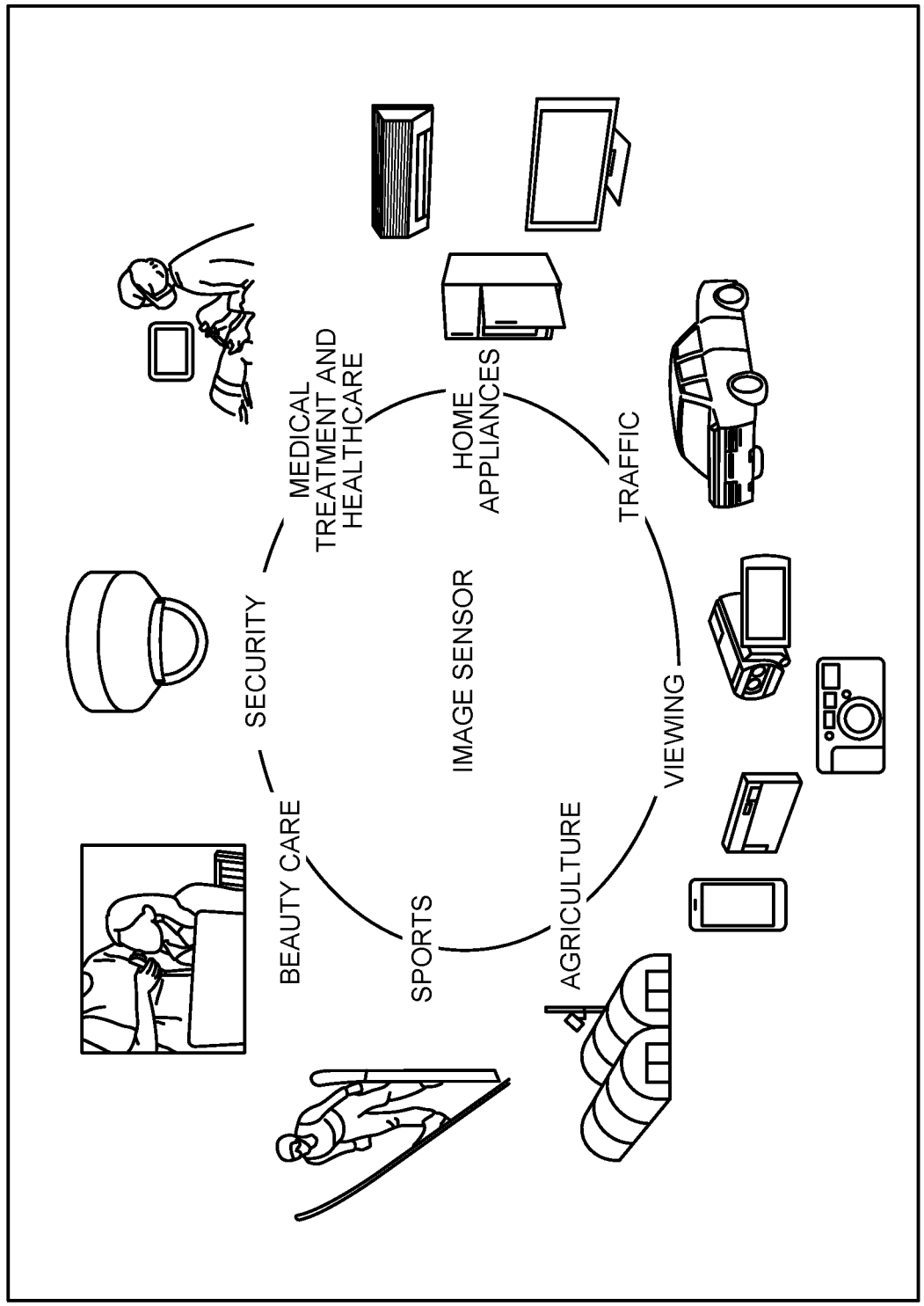
FIG. 26 is a diagram illustrating a use example of the imaging device according to the present disclosure.

Next, a use example of the imaging device to which the technology according to the present disclosure is applied will be described. FIG. 26 is a diagram illustrating a use example of the above-described imaging device 1 according to the present disclosure.

The above-described imaging device 1 can be used, for example, in various cases of sensing light such as visible light, infrared light, ultraviolet light, and X-rays as described below.

- A device that captures an image provided for viewing, such as a digital camera and a portable device with an imaging function
- A device provided for traffic, such as an in-vehicle sensor for capturing an image of a region in front of, behind, surrounding, or inside a vehicle, a monitoring camera for monitoring a traveling vehicle or a road, or a distance measurement sensor for measuring a distance between vehicles, for the purpose of safe driving such as automatic stop and recognition of a driver's state
- A device provided for home appliances, such as a television (TV), a refrigerator, and an air conditioner, to capture an image of the gesture of the user and perform a device operation in accordance with the gesture
- A device provided for medical treatment and healthcare, such as an endoscope or a device for capturing an image of blood vessels by receiving infrared light
- A device provided for security, such as a monitoring camera for security or a camera for personal authentication
- A device provided for beauty care, such as a skin measuring device for capturing an image of skin or a microscope for capturing an image of scalp
- A device provided for sports, such as an action camera or a wearable camera for use in sports
- A device provided for agriculture, such as a camera for monitoring the state of fields and crops 4-0. Example of Application to Moving Body The technology according to the present disclosure (the present technology) can be applied to various products described above. For example, the technology according to the present disclosure may be implemented as a device mounted in any one of moving bodies such as a vehicle, an electric vehicle, a hybrid electric vehicle, a motorcycle, a bicycle, a personal mobility device, a plane, a drone, a ship, and a robot.

(More Specific Example in Case where Imaging Device of Present Disclosure is Mounted on Vehicle)

As an application example of the imaging device 1 according to the present disclosure, a more specific example in a case where the imaging device 1 is mounted on a vehicle and used will be described.

(First Mounting Example)

Figure 27:
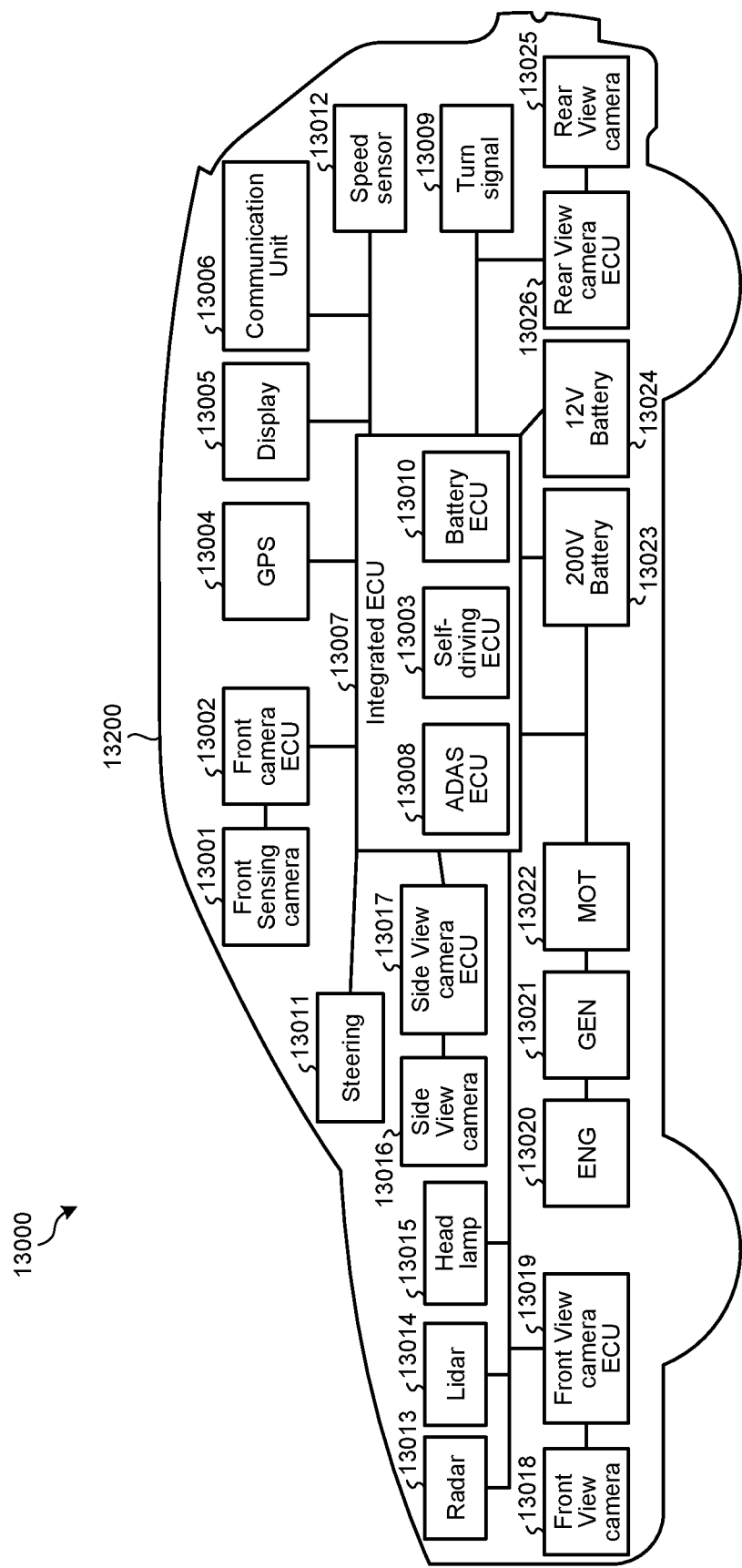
FIG. 27 is a block diagram illustrating a system configuration example of a vehicle on which the imaging device according to the present disclosure can be mounted.

First, a first mounting example of the imaging device 1 according to the present disclosure will be described. FIG. 27 is a block diagram illustrating a system configuration example of a vehicle on which the imaging device 1 according to the present disclosure can be mounted. In FIG. 27, a vehicle system 13200 includes units connected to a controller area network (CAN) provided for a vehicle 13000.

A front sensing camera 13001 is a camera that captures an image of a front region in a vehicle traveling direction. In general, the camera is not used for image display, but is a camera specialized in sensing. The front sensing camera 13001 is arranged, for example, near a rearview mirror positioned on an inner side of a windshield.

A front camera ECU 13002 receives image data captured by the front sensing camera 13001, and performs image signal processing including image recognition processing such as image quality improvement and object detection. A result of the image recognition performed by the front camera ECU is transmitted through CAN communication.

Note that the ECU is an abbreviation for "electronic control unit".

A self-driving ECU 13003 is an ECU that controls automatic driving, and is implemented by, for example, a CPU, an ISP, a graphics processing unit (GPU), and the like. A result of image recognition performed by the GPU is transmitted to a server, and the server performs deep learning such as a deep neural network and returns a learning result to the self-driving ECU 13003.

A global positioning system (GPS) 13004 is a position information acquisition unit that receives GPS radio waves and obtains a current position. Position information acquired by the GPS 13004 is transmitted through CAN communication.

A display 13005 is a display device arranged in the vehicle body 13000. The display 13005 is arranged at a central portion of an instrument panel of the vehicle body

13000, inside the rearview mirror, or the like. The display 13005 may be configured integrally with a car navigation device mounted on the vehicle 13000.

A communication unit 13006 functions to perform data transmission and reception in vehicle-to-vehicle communication, pedestrian-to-vehicle communication, and road-to-vehicle communication. The communication unit 13006 also performs transmission and reception with the server. Various types of wireless communication can be applied to the communication unit 13006.

An integrated ECU 13007 is an integrated ECU in which various ECUs are integrated. In this example, the integrated ECU 13007 includes an ADAS ECU 13008, the self-driving ECU 13003, and a battery ECU 13010. The battery ECU 13010 controls a battery (a 200V battery 13023, a 12V battery 13024, or the like). The integrated ECU 13007 is arranged, for example, at a central portion of the vehicle body 13000.

A turn signal 13009 is a direction indicator, and lighting thereof is controlled by the integrated ECU 13007.

The advanced driver assistance system (ADAS) ECU 13008 generates a control signal for controlling components of the vehicle system 13200 according to a driver operation, an image recognition result, or the like. The ADAS ECU 13008 transmits and receives a signal to and from each unit through CAN communication.

In the vehicle system 13200, a drive source (an engine or a motor) is controlled by a powertrain ECU (not illustrated). The powertrain ECU controls the drive source according to the image recognition result during cruise control.

A steering 13011 drives an electronic power steering motor according to the control signal generated by the ADAS ECU 13008 when the vehicle is about to deviate from a white line in image recognition.

A speed sensor 13012 detects a traveling speed of the vehicle 13000. The speed sensor 13012 calculates acceleration and differentiation (jerk) of the acceleration from the traveling speed. Acceleration information is used to calculate an estimated time before collision with an object. The jerk is an index that affects a ride comfort of an occupant.

A radar 13013 is a sensor that performs distance measurement by using electromagnetic waves having a long wavelength such as millimeter waves. A lidar 13014 is a sensor that performs distance measurement by using light.

A headlamp 13015 includes a lamp and a driving circuit of the lamp, and performs switching between a high beam and a low beam depending on the presence or absence of a headlight of an oncoming vehicle detected by image recognition. Alternatively, the headlamp 13015 emits a high beam so as to avoid an oncoming vehicle.

A side view camera 13016 is a camera arranged in a housing of a side mirror or near the side mirror. Image data output from the side view camera 13016 is used for m image display. The side view camera 13016 captures an image of, for example, a blind spot region of the driver. Further, the side view camera 13016 captures images used for left and right regions of an around view monitor.

A side view camera ECU 13017 performs signal processing on an image captured by the side view camera 13016. The side view camera ECU 13017 improves image quality such as white balance. Image data subjected to the signal processing by the side view camera ECU 13017 is transmitted through a cable different from the CAN.

A front view camera 13018 is a camera arranged near a front grille. Image data captured by the front view camera 13018 is used for image display. The front view camera 13018 captures an image of a blind spot region in front of the vehicle. In addition, the front view camera 13018 captures an image used in an upper region of the around view monitor. The front view camera 13018 is different from the front sensing camera 13001 described above in regard to a frame layout.

A front view camera ECU 13019 performs signal processing on an image captured by the front view camera 13018. The front view camera ECU 13019 improves image quality such as white balance. Image data subjected to the signal processing by the front view camera ECU 13019 is transmitted through a cable different from the CAN.

The vehicle body 13000 includes an engine (ENG) 13020, a generator (GEN) 13021, and a driving motor (MOT) 13022. The engine 13020, the generator 13021, and the driving motor 13022 are controlled by the powertrain ECU (not illustrated).

The 200V battery 13023 is a power source for driving and an air conditioner. The 12V battery 13024 is a power source other than the power source for driving and the air conditioner. The 12V battery 13024 supplies power to each camera and each ECU mounted on the vehicle body 13000.

A rear view camera 13025 is, for example, a camera arranged near a license plate of a tailgate. Image data captured by the rear view camera 13025 is used for image display. The rear view camera 13025 captures an image of a blind spot region behind the vehicle. Further, the rear view camera 13025 captures an image used in a lower region of the around view monitor. The rear view camera 13025 is activated by, for example, moving a shift lever to "R (rearward)".

A rear view camera ECU 13026 performs signal processing on an image captured by the rear view camera 13025. The rear view camera ECU 13026 improves image quality such as white balance. Image data subjected to the signal processing by the rear view camera ECU 13026 is transmitted through a cable different from the CAN.

Figure 28:
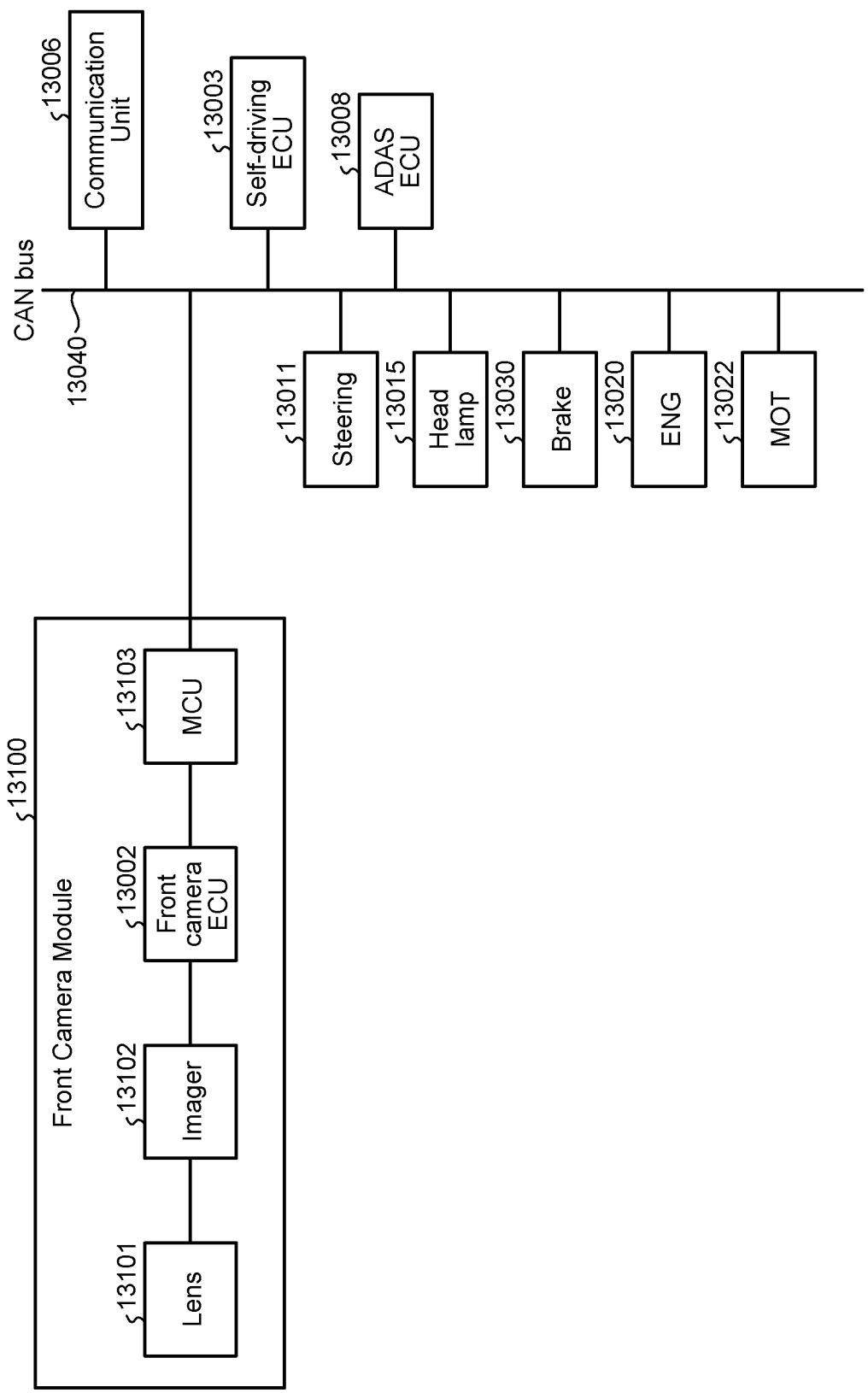
FIG. 28 is a block diagram illustrating a configuration of an example of a front sensing camera of a vehicle system.

FIG. 28 is a block diagram illustrating a configuration of an example of the front sensing camera 13001 of the vehicle system 13200.

A front camera module 13100 includes a lens 13101, an imager 13102, a front camera ECU 13002, and a microcontroller unit (MCU) 13103. The lens 13101 and the imager 13102 are included in the front sensing camera 13001 described above. The front camera module 13100 is arranged, for example, near the rearview mirror positioned on the inner side of the windshield.

The imager 13102 can be implemented by using the imaging unit 10 according to the present disclosure, and captures a front region image by a light receiving element included in a pixel and outputs pixel data. For example, the Bayer arrangement is used as a color filter arrangement for pixels. The imager 13102 may be formed of a single-layer chip, or may be a stacked imager in which two or more chips are stacked. The imager 13102 outputs the pixel data as, for example, raw data. The front camera ECU 13002 includes, for example, the image processing unit 12, the output processing unit 13, and the control unit 14 according to the present disclosure. That is, the imaging device 1 according to the present disclosure includes the imager 13102 and the front camera ECU 13002.

Note that either serial transmission or parallel transmission may be applied to data transmission between the imager 13102 and the front camera ECU 13002. In addition, it is preferable that the imager 13102 has a function of detecting a failure of the imager 13102 itself.

The MCU 13103 has a function of an interface with a CAN bus 13104. Each unit (the self-driving ECU 13003, the communication unit 13006, the ADAS ECU 13008, the steering 13011, the headlamp 13015, the engine 13020, the driving motor 13022, or the like) illustrated in FIG. 27 is connected to the CAN bus 13104. A brake system 13030 is also connected to the CAN bus 13040.

The front camera module 13100 can acquire vehicle information (a traveling speed, an ambient brightness, or the like) of the vehicle 13000 from the CAN bus 13040. For example, in the front camera module 13100, the front camera ECU 13002 can instruct whether to perform reading of a pixel in the imager 13102 in the addition mode or the individual mode on the basis of the acquired vehicle information. This makes it possible to output image data corresponding to the traveling speed, the brightness, and the like, and to save power.

Note that, in the above description, it has been described that the imaging device 1 according to the present disclosure is applied to the front sensing camera 13001, but the present disclosure is not limited to thereto. For example, the imaging device 1 according to the present disclosure may be applied to the front view camera 13018, the side view camera 13016, and the rear view camera 13025.

(Second Mounting Example)

Figure 29:
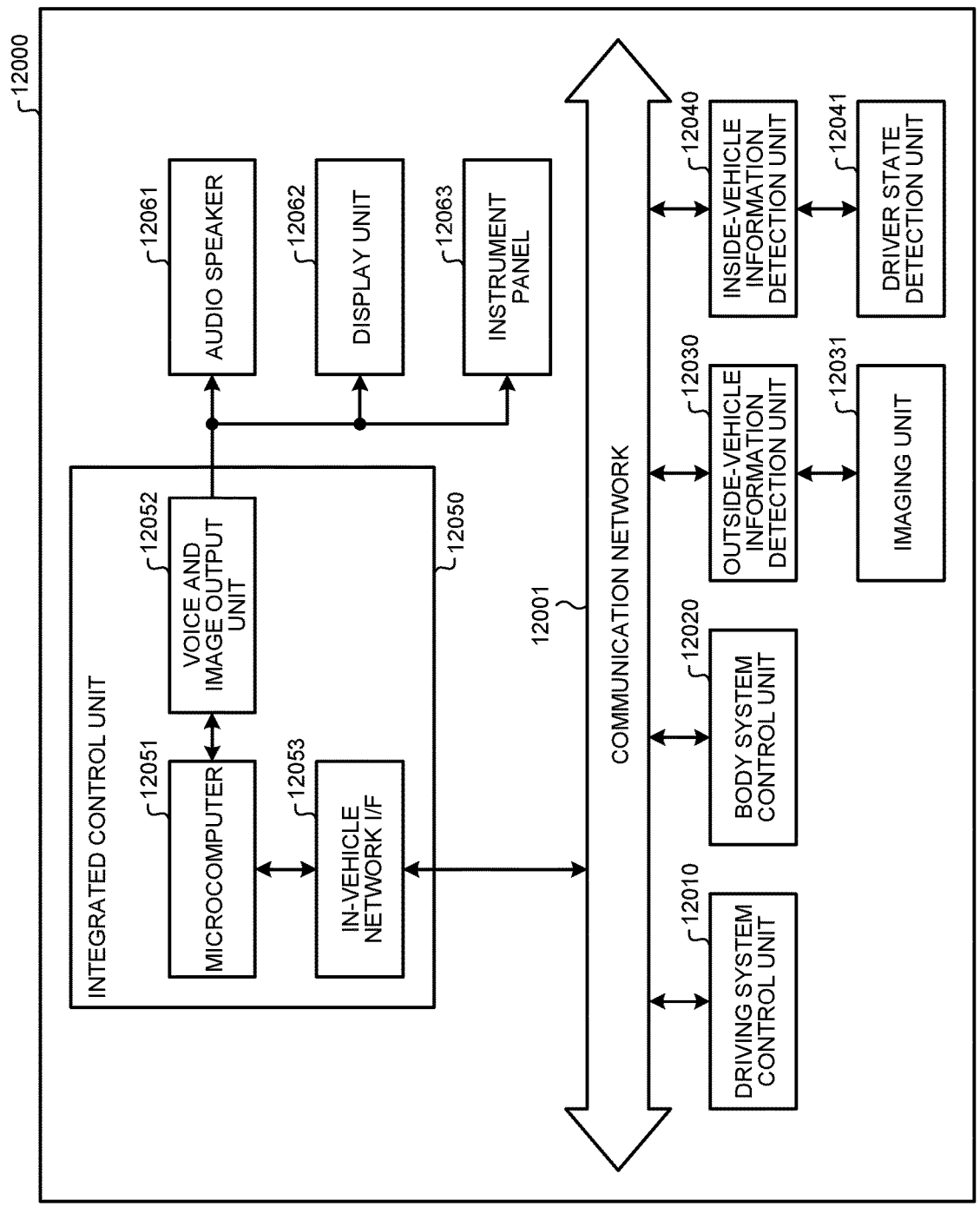
FIG. 29 is a block diagram illustrating an example of a schematic configuration of a vehicle control system which is an example of a moving body control system to which a technology according to the present disclosure can be applied.

Next, a second mounting example of the imaging device 1 according to the present disclosure will be described. FIG. 29 is a block diagram illustrating an example of a schematic configuration of a vehicle control system which is an example of a moving body control system to which the technology according to the present disclosure can be applied.

A vehicle control system 12000 includes a plurality of electronic control units connected through a communication network 12001. In the example illustrated in FIG. 29, the vehicle control system 12000 includes a driving system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, a voice and image output unit 12052, and an in-vehicle network interface (I/F) 12053 are illustrated.

The driving system control unit 12010 controls an operation of a device related to a driving system of a vehicle according to various programs. For example, the driving system control unit 12010 functions as a control device such as a driving force generation device for generating a driving force of a vehicle such as an internal combustion engine, a driving motor, or the like, a driving force transmission mechanism for transmitting a driving force to vehicle wheels, a steering mechanism for adjusting a steering angle of the vehicle, a brake device for generating a braking force of the vehicle, or the like.

The body system control unit 12020 controls an operation of various devices mounted in a vehicle body according to various programs. For example, the body system control unit 12020 functions as a keyless entry system, a smart key system, a power window device, or a control device for various lamps such as a headlamp, a back lamp, a brake lamp, a blinker, a fog lamp, and the like. In this case, electric waves sent from a portable machine substituting for a key or a signal of various switches can be input to the body system control unit 12020. The body system control unit 12020 receives the electric waves or the signal to control a door-lock device of a vehicle, a power window device, a lamp, or the like.

The outside-vehicle information detection unit 12030 detects information regarding an outside area of a vehicle on which the vehicle control system 12000 is mounted. For example, an imaging unit 12031 is connected to the outside-vehicle information detection unit 12030. The outside-vehicle information detection unit 12030 causes the imaging unit 12031 to capture an image of an area outside the vehicle, and receives the captured image. The outside-vehicle information detection unit 12030 may perform processing of detecting an object such as a person, a car, an obstacle, a sign, a letter on a road surface, or the like, or perform distance detection processing on the basis of the received image.

The imaging unit 12031 is an optical sensor that receives light and outputs an electric signal corresponding to the amount of received light. The imaging unit 12031 can output the electric signal as an image, or can output the electric signal as distance measurement information. Furthermore, the light received by the imaging unit 12031 may be visible light or invisible light such as infrared rays or the like.

The inside-vehicle information detection unit 12040 detects information regarding an inside area of the vehicle. For example, a driver state detection unit 12041 detecting a state of a driver is connected to the inside-vehicle information detection unit 12040. The driver state detection unit 12041 includes, for example, a camera capturing an image of the driver, and the inside-vehicle information detection unit 12040 may calculate a degree of fatigue or a degree of concentration of the driver, or discriminate whether or not the driver is dozing off on the basis of detection information input from the driver state detection unit 12041.

The microcomputer 12051 can calculate a target control value of a driving force generation device, a steering mechanism, or a brake device on the basis of information regarding the inside area and the outside area of the vehicle, the information being acquired by the outside-vehicle information detection unit 12030 or the inside-vehicle information detection unit 12040, and can output a control instruction to the driving system control unit 12010. For example, the microcomputer 12051 can perform a cooperative control for the purpose of implementing functions of an advanced driver assistance system (ADAS) including vehicle collision avoidance, impact alleviation, following traveling based on an inter-vehicle distance, traveling while maintaining a vehicle speed, a vehicle collision warning, a vehicle lane departure warning, or the like.

Furthermore, the microcomputer 12051 can perform a cooperative control for the purpose of an automatic driving in which a vehicle autonomously travels without an operation by a driver by controlling a driving force generation device, a steering mechanism, a brake device, or the like on the basis of information regarding a surrounding area of the vehicle acquired by the outside-vehicle information detection unit 12030 or the inside-vehicle information detection unit 12040, or the like.

Furthermore, the microcomputer 12051 can output a control instruction to the body system control unit 12020 on the basis of outside-vehicle information acquired by the outside-vehicle information detection unit 12030. For example, the microcomputer 12051 can perform a cooperative control for the purpose of preventing glare by controlling a headlamp according to a position of a preceding vehicle or an oncoming vehicle detected by the outside-vehicle information detection unit 12030 to switch a high beam to a low beam, or the like.

The voice and image output unit 12052 transmits an output signal of at least one of voice or an image to an output device which is capable of visually or acoustically notifying a passenger of a vehicle or an outside area of the vehicle of information. In the example in FIG. 29, an audio speaker 12061, a display unit 12062, and an instrument panel 12063 are illustrated as the output devices. The display unit 12062 may include at least one of, for example, an on-board display or a head-up display.

Figure 30:
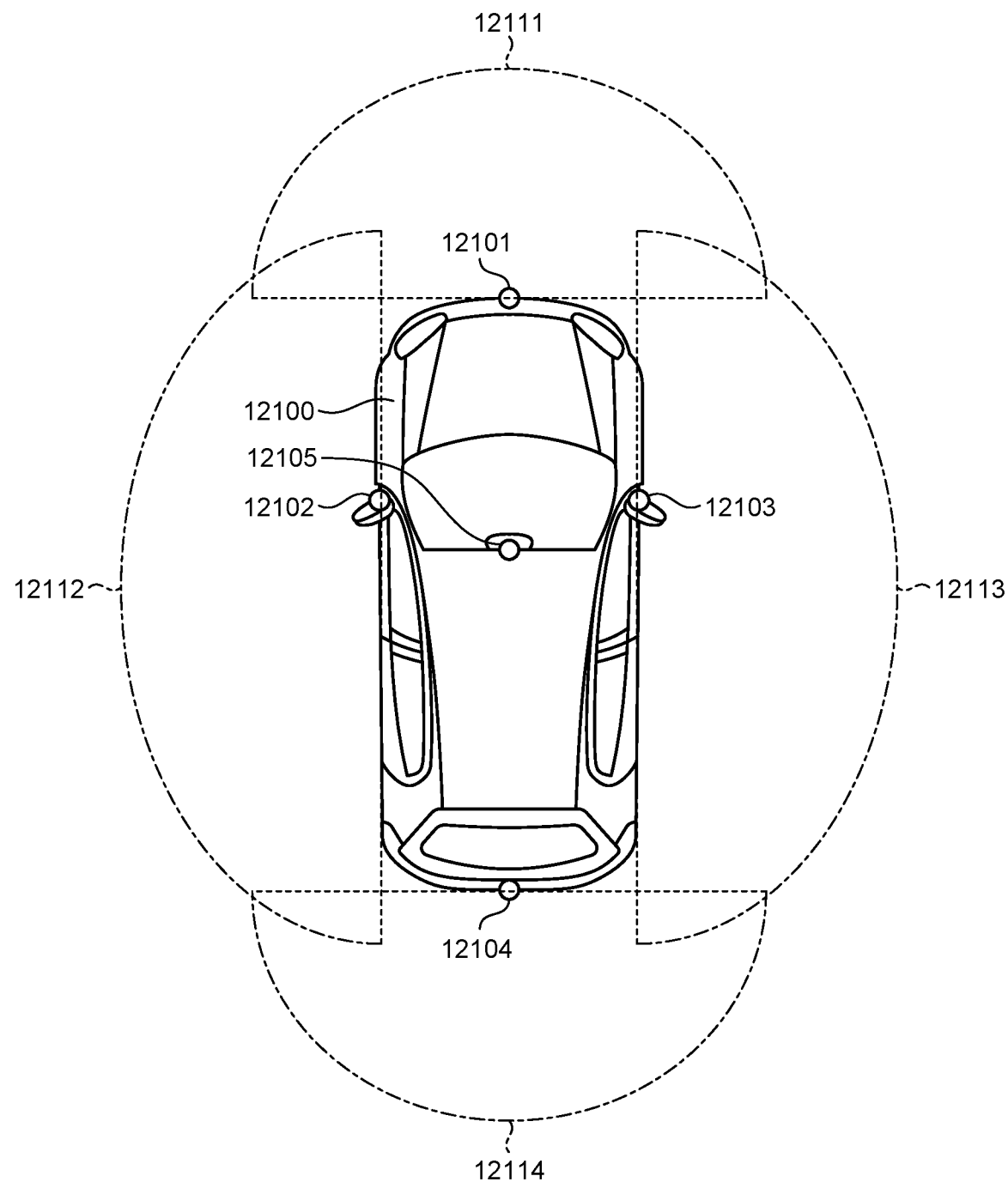
FIG. 30 is a diagram illustrating an example of an installation position of the imaging unit.

FIG. 30 is a diagram illustrating an example of an installation position of the imaging unit 12031.

In FIG. 30, a vehicle 12100 includes imaging units 12101, 12102, 12103, 12104, and 12105 as the imaging unit 12031.

The imaging units 12101, 12102, 12103, 12104, and 12105 are provided at, for example, a front nose, side mirrors, a rear bumper, a back door, an upper portion of a windshield in a compartment, and the like of the vehicle 12100. The imaging unit 12101 provided at the front nose and the imaging unit 12105 provided at the upper portion of the windshield in the compartment mainly acquire an image of an area in front of the vehicle 12100. The imaging units 12102 and 12103 provided at the side mirrors mainly acquire images of areas on sides of the vehicle 12100. The imaging unit 12104 provided at the rear bumper or the back door mainly acquires an image of an area behind the vehicle 12100. The images of the area in front of the vehicle 12100 acquired by the imaging units 12101 and 12105 are mainly used to detect a preceding vehicle, a pedestrian, an obstacle, a traffic light, a traffic sign, a lane, or the like.

Note that FIG. 30 illustrates an example of imaging ranges of the imaging units 12101 to 12104. An image capturing range 12111 indicates an image capturing range of the imaging unit 12101 provided at the front nose, image capturing ranges 12112 and 12113 indicate image capturing ranges of the imaging units 12102 and 12103 provided at the side mirrors, respectively, and an image capturing range 12114 indicates an image capturing range of the imaging unit 12104 provided at the rear bumper or the back door. For example, image data captured by the imaging units 12101 to 12104 are superimposed, thereby obtaining a bird's eye view image from above the vehicle 12100.

At least one of the imaging units 12101 to 12104 may have a function of acquiring distance information. For example, at least one of the imaging units 12101 to 12104 may be a stereo camera including a plurality of imaging elements, or may be an imaging element with pixels for phase difference detection.

For example, the microcomputer 12051 can extract a three-dimensional object traveling at a predetermined speed (for example, 0 km/h or higher) in substantially the same direction as that of the vehicle 12100, particularly, the closest three-dimensional object on a traveling path of the vehicle 12100, as a preceding vehicle, by calculating a distance to each three-dimensional object in the image capturing ranges 12111 to 12114, and a temporal change (a relative speed with respect to the vehicle 12100) in the distance on the basis of the distance information acquired from the imaging units 12101 to 12104. Moreover, the microcomputer 12051 can set an inter-vehicle distance to be secured in advance for a preceding vehicle, and can perform an automatic brake control (including a following stop control), an automatic acceleration control (including a following start control), and the like. As described above, a cooperative control for the purpose of an automatic driving in which a vehicle autonomously travels without an operation by a driver, or the like, can be performed.

For example, the microcomputer 12051 can classify and extract three-dimensional object data related to a three-dimensional object as a two-wheeled vehicle, an ordinary vehicle, a large vehicle, a pedestrian, and another three-dimensional object such as a power pole, on the basis of the distance information obtained from the imaging units 12101 to 12104, and use a result of the classification and extraction for automatic obstacle avoidance. For example, the microcomputer 12051 identifies an obstacle around the vehicle 12100 as an obstacle that is visible to the driver of the vehicle 12100 or an obstacle that is hardly visible. Then, the microcomputer 12051 determines a collision risk indicating a risk of collision with each obstacle, and in a case where the collision risk is equal to or higher than a set value and there is a possibility of collision, the microcomputer 12051 can output an alarm to the driver through the audio speaker 12061 or the display unit 12062 or perform forced deceleration or avoidance steering through the driving system control unit 12010 to perform driving assistance for collision avoidance.

At least one of the imaging units 12101 to 12104 may be an infrared camera that detects infrared rays. For example, the microcomputer 12051 can recognize a pedestrian by determining whether or not a pedestrian is present in captured images of the imaging units 12101 to 12104. Such a recognition of a pedestrian is performed through a procedure for extracting feature points in the captured images of the imaging units 12101 to 12104 that are, for example, infrared cameras, and a procedure for discriminating whether or not the object is a pedestrian by performing pattern matching processing on a series of feature points indicating an outline of the object. In a case where the microcomputer 12051 determines that a pedestrian is present in the captured images of the imaging units 12101 to 12104 and recognizes the pedestrian, the voice and image output unit 12052 controls the display unit 12062 to superimpose a rectangular contour line for emphasis on the recognized pedestrian. Furthermore, the voice and image output unit 12052 may control the display unit 12062 to display an icon or the like indicating a pedestrian at a desired position.

Hereinabove, an example of the vehicle control system to which the technology according to the present disclosure can be applied has been described. The technology according to the present disclosure can be applied to, for example, the imaging unit 12031 among the above-described configurations. Specifically, the imaging device 1 according to any one of the first and second embodiments of the present disclosure and the modified examples thereof can be applied as the imaging unit 12031.

In this case, the imaging unit 12031 can acquire vehicle information (a traveling speed, an ambient brightness, or the like) of the vehicle from the communication network 12001. For example, the imaging unit 12031 can instruct whether to perform reading of a pixel in a pixel array included in the imaging unit 12031 in the addition mode or the individual mode on the basis of the acquired vehicle information. This makes it possible to output image data corresponding to the traveling speed, the brightness, and the like, and to save power.

4-1. Example of Application to Endoscopic Surgery System

As another application example of the imaging device 1 according to the present disclosure, a more specific example in a case where the imaging device 1 is applied to an endoscopic surgery system will be described.

Figure 31:
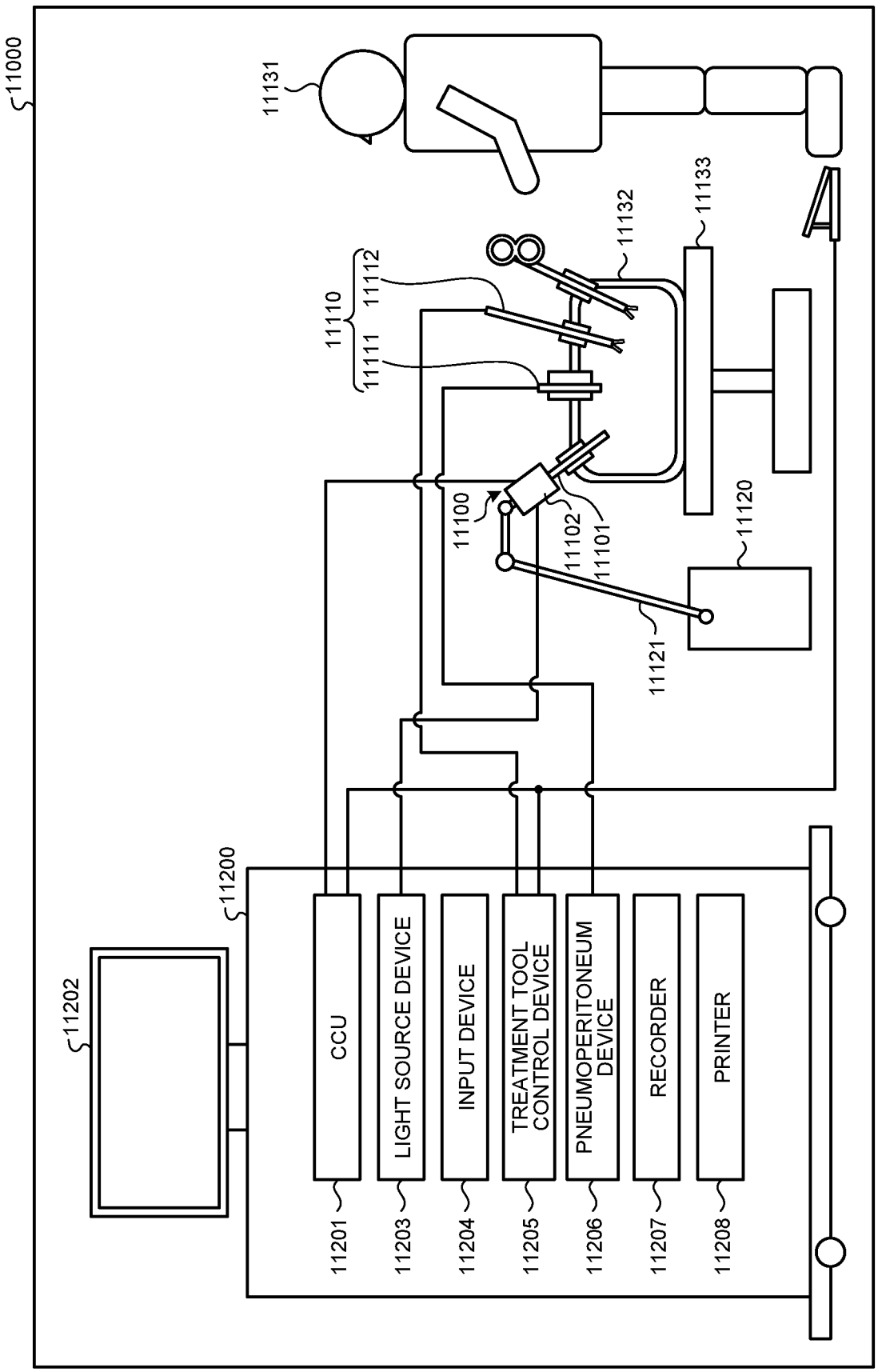
FIG. 31 is a diagram illustrating an example of a schematic configuration of an endoscopic surgery system.

FIG. 31 is a diagram illustrating an example of a schematic configuration of an endoscopic surgery system to which the technology according to the present disclosure (the present technology) can be applied.

FIG. 31 illustrates a state in which an operator (doctor) 11131 is performing surgery on a patient 11132 on a patient bed 11133 by using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 in which a region corresponding to a predetermined length from a distal end is inserted into the body cavity of the patient 11132, and a camera head 11102 connected to a proximal end of the lens barrel 11101. In the illustrated example, the endoscope 11100 configured as a so-called rigid endoscope including the rigid lens barrel 11101 is illustrated, but the endoscope 11100 may be configured as a so-called flexible endoscope including a flexible lens barrel.

An opening portion into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101, and is emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted to a camera control unit (CCU) 11201 as raw data.

The CCU 11201 is implemented by a central processing unit (CPU), a graphics processing unit (GPU), and the like, and integrally controls operations of the endoscope 11100 and a display device 11202. Furthermore, the CCU 11201 receives the image signal from the camera head 11102, and performs various types of image processing for displaying an image based on the image signal, such as development processing (demosaic processing), on the image signal.

The display device 11202 displays an image based on the image signal subjected to the image processing by the CCU 11201 under the control of the CCU 11201.

The light source device 11203 is implemented by a light source such as a light emitting diode (LED), for example, and supplies, to the endoscope 11100, irradiation light for capturing an image of a surgical site or the like.

An input device 11204 is an input interface for the endoscopic surgery system 11000. A user can input various types of information or instructions to the endoscopic surgery system 11000 via the input device 11204. For example, the user inputs an instruction to change imaging conditions (a type of the irradiation light, a magnification, a focal length, and the like) of the endoscope 11100 and the like.

A treatment tool control device 11205 controls driving of the energy treatment tool 11112 for cauterization and incision of tissue, vascular closure, or the like. A pneumoperitoneum device 11206 feeds gas into the body cavity of the patient 11132 via the pneumoperitoneum tube 11111 in order to inflate the body cavity for the purpose of securing a clear view for the endoscope 11100 and securing a working space for the operator. A recorder 11207 is a device capable of recording various types of information regarding surgery. A printer 11208 is a device capable of printing various types of information regarding surgery in various formats such as text, images, or graphs.

Note that the light source device 11203 that supplies the irradiation light to the endoscope 11100 at the time of capturing an image of the surgical site can include, for example, a white light source implemented by an LED, a laser light source, or a combination thereof. In a case where the white light source is implemented by a combination of RGB laser light sources, an output intensity and an output timing of each color (each wavelength) can be controlled with high accuracy, and thus, white balance adjustment of the captured image can be performed in the light source device 11203. Furthermore, in this case, the observation target is irradiated with laser light from each of the RGB laser light sources in a time division manner and the driving of the imaging element of the camera head 11102 is controlled in synchronization with a timing of the irradiation, such that it is also possible to capture an image corresponding to each of RGB in a time division manner. With this method, a color image can be obtained without providing a color filter in the imaging element.

Furthermore, the driving of the light source device 11203 may be controlled so as to change the intensity of light to be output every predetermined time. The driving of the imaging element of the camera head 11102 is controlled in synchronization with a timing of the change of the intensity of the light to acquire images in a time division manner, and the images are combined, such that it is possible to generate a high dynamic range image without so-called underexposure and overexposure.

Furthermore, the light source device 11203 may be configured to be able to supply light in a predetermined wavelength band corresponding to special light observation. In the special light observation, for example, so-called narrow band imaging, in which an image of a predetermined tissue such as a blood vessel in a mucosal epithelial layer is captured with high contrast by radiating light in a narrower band than irradiation light (that is, white light) at the time of normal observation, by using wavelength dependency of light absorption in a body tissue, is performed. Alternatively, in the special light observation, fluorescence observation for obtaining an image by fluorescence generated by irradiation with excitation light may be performed. In the fluorescence observation, for example, fluorescence from a body tissue can be observed by irradiating the body tissue with excitation light (autofluorescence observation), or a fluorescent image can be obtained by locally injecting a reagent such as indocyanine green (ICG) into a body tissue and irradiating the body tissue with excitation light corresponding to a fluorescence wavelength of the reagent. The light source device 11203 can be configured to be able to supply narrow band light and/or excitation light corresponding to such special light observation.

Figure 32:
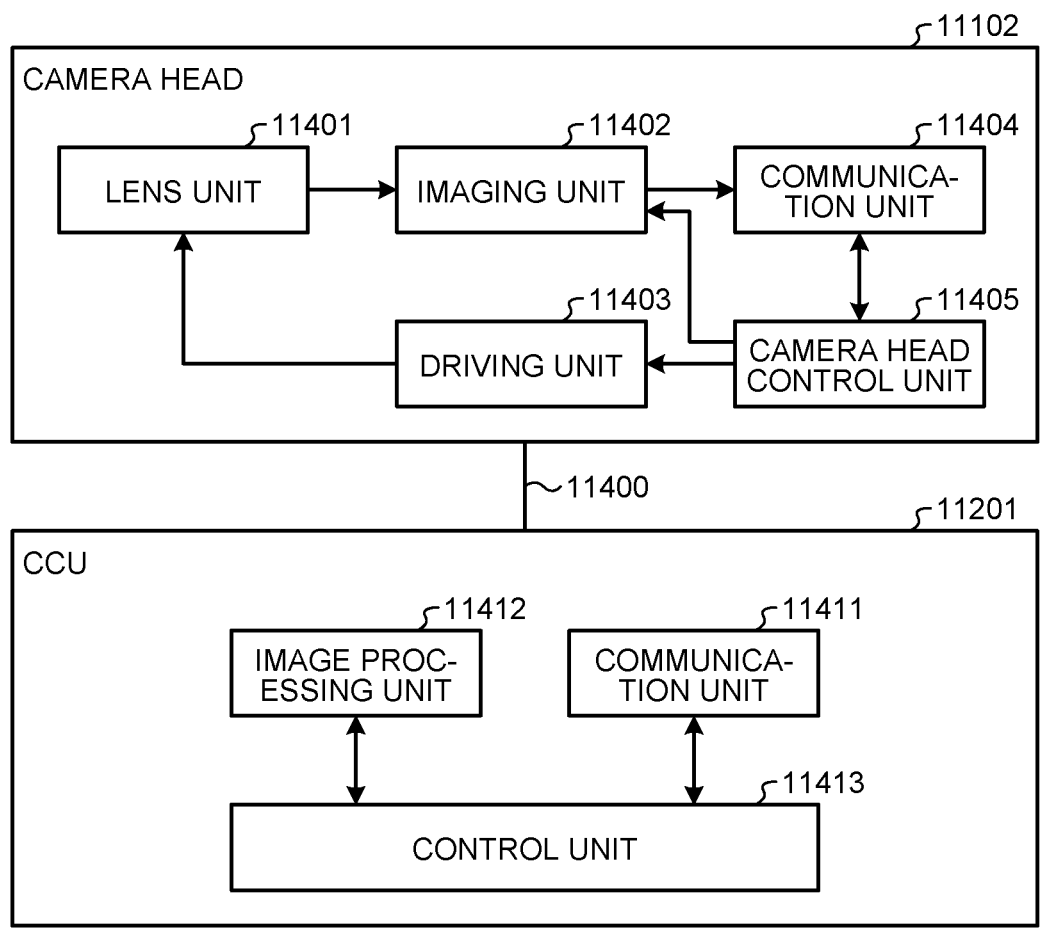
FIG. 32 is a block diagram illustrating an example of a functional configuration of a camera head and a cameral control unit (CCU).

FIG. 32 is a block diagram illustrating an example of functional configurations of the camera head 11102 and the CCU 11201 illustrated in FIG. 31.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a portion at which the camera head 11102 is connected to the lens barrel 11101. The observation light taken in from the distal end of the lens barrel 11101 is guided to the camera head 11102 and is incident on the lens unit 11401. The lens unit 11401 is implemented by combining a plurality of lenses including a zoom lens and a focus lens.

The imaging unit 11402 includes the imaging element. The number of imaging elements included in the imaging unit 11402 may be one (so-called single-plate type) or plural (so-called multi-plate type). In a case where the imaging unit 11402 is configured as the multi-plate type, for example, image signals corresponding to RGB, respectively, may be generated by the respective imaging elements, and a color image may be obtained by combining the image signals. Alternatively, the imaging unit 11402 may include a pair of imaging elements for acquiring image signals for the right eye and the left eye corresponding to three-dimensional (3D) display. As the 3D display is performed, the operator 11131 can more accurately grasp a depth of a living tissue in the surgical site. Note that, in a case where the imaging unit 11402 is configured as the multi-plate type, a plurality of lens units 11401 can be provided corresponding to the respective imaging elements.

Furthermore, the imaging unit 11402 does not have to be necessarily provided in the camera head 11102. For example, the imaging unit 11402 may be provided immediately behind the objective lens inside the lens barrel 11101.

The driving unit 11403 is implemented by an actuator, and moves the zoom lens and the focus lens of the lens unit 11401 by a predetermined distance along an optical axis under the control of the camera head control unit 11405. As a result, a magnification and a focal point of the image captured by the imaging unit 11402 can be appropriately adjusted.

The communication unit 11404 is implemented by a communication device for transmitting and receiving various types of information to and from the CCU 11201. The communication unit 11404 transmits the image signal obtained from the imaging unit 11402 as raw data to the CCU 11201 via the transmission cable 11400.

Furthermore, the communication unit 11404 receives a control signal for controlling driving of the camera head 11102 from the CCU 11201, and supplies the control signal to the camera head control unit 11405. The control signal includes, for example, information regarding imaging conditions such as information for specifying a frame rate of the captured image, information for specifying an exposure value at the time of imaging, and/or information for specifying the magnification and the focal point of the captured image.

Note that the imaging conditions such as the frame rate, the exposure value, the magnification, and the focal point may be appropriately specified by the user, or may be automatically set by the control unit 11413 of the CCU 11201 on the basis of the acquired image signal. In the latter case, the endoscope 11100 has a so-called auto exposure (AE) function, an auto focus (AF) function, and an auto white balance (AWB) function.

The camera head control unit 11405 controls the driving of the camera head 11102 on the basis of the control signal received from the CCU 11201 via the communication unit 11404.

The communication unit 11411 is implemented by a communication device for transmitting and receiving various types of information to and from the camera head 11102. The communication unit 11411 receives the image signal transmitted from the camera head 11102 via the transmission cable 11400.

Furthermore, the communication unit 11411 transmits a control signal for controlling the driving of the camera head 11102 to the camera head 11102. The image signal or the control signal can be transmitted by electric communication, optical communication, or the like.

The image processing unit 11412 performs various types of image processing on the image signal that is raw data transmitted from the camera head 11102.

The control unit 11413 performs various types of controls related to capturing of the image of the surgical site or the like performed by the endoscope 11100 and display of the captured image obtained by the capturing of the image of the surgical site or the like. For example, the control unit 11413 generates a control signal for controlling the driving of the camera head 11102.

Furthermore, the control unit 11413 causes the display device 11202 to display the captured image of the surgical site or the like on the basis of the image signal subjected to the image processing by the image processing unit 11412. At this time, the control unit 11413 may recognize various objects in the captured image by using various image recognition technologies. For example, the control unit 11413 can recognize a surgical tool such as forceps, a specific site in the living body, bleeding, mist at the time of using the energy treatment tool 11112, and the like by detecting an edge shape, color, and the like of the object included in the captured image. When displaying the captured image on the display device 11202, the control unit 11413 may superimpose various types of surgery support information on the image of the surgical site by using the recognition result. The surgery support information is superimposed and displayed and presented to the operator 11131, such that a burden on the operator 11131 can be reduced and the operator 11131 can reliably proceed with the surgery.

The transmission cable 11400 connecting the camera head 11102 and the CCU 11201 is an electric signal cable supporting electric signal communication, an optical fiber supporting optical communication, or a composite cable thereof.

Here, in the illustrated example, wired communication is performed using the transmission cable 11400, but wireless communication may be performed between the camera head 11102 and the CCU 11201.

Hereinabove, an example of the endoscopic surgery system to which the technology according to the present disclosure can be applied has been described. The technology according to the present disclosure can be applied to, for example, the endoscope 11100 and the imaging unit 11402 of the camera head 11102 among the above-described configurations. Specifically, the above-described imaging element can be applied to an imaging unit 10112.

The imaging unit 10112 to which the imaging element according to the present disclosure is applied can give an instruction as to whether to perform reading of a pixel in the pixel array included in the imaging unit 12031 in the addition mode in which high-speed reading is possible and the SNR is high or the individual mode in which the resolution is high. As a result, for example, the operator 11131 can obtain a captured image according to the surgical site and the state of the surgical site. As a result, for example, the operator 11131 can more reliably proceed with the surgery, and power saving can be achieved.

Note that, here, the endoscopic surgery system has been described as an example, but the technology according to the present disclosure may be applied to, for example, a microscopic surgery system or the like.

Note that the effects described in the present specification are merely examples. The effects of the present disclosure are not limited thereto, and other effects may be obtained.

Note that the present technology can also have the following configurations.

(1) An imaging device comprising:
an imaging unit that includes a pixel array including a plurality of pixel groups each including N×N pixels (N is an integer of 2 or more), and outputs a pixel signal read from each pixel; and
a switching unit that switches a reading mode in which the pixel signal is read from each of the pixels by the imaging unit, wherein
the switching unit switches
the reading mode between
an addition mode in which the pixel signals read from the N×N pixels included in the pixel group are added to form one pixel signal and
an individual mode in which each of the pixel signals read from the N×N pixels included in the pixel group is individually output.

(2) The imaging device according to the above (1), wherein
the imaging device is mounted on a vehicle, and
the switching unit
switches the reading mode on a basis of vehicle information acquired from the vehicle.

(3) The imaging device according to the above (2), wherein
the switching unit
switches the reading mode according to a speed of the vehicle acquired as the vehicle information.

(4) The imaging device according to the above (2) or (3), wherein
the switching unit
switches the reading mode according to a brightness around the vehicle acquired as the vehicle information.

(5) The imaging device according to any one of the above (2) to (4), wherein
the switching unit
switches the reading mode to the individual mode in a case where a speed of the vehicle acquired as the vehicle information is equal to or higher than a predetermined value and a brightness around the vehicle acquired as the vehicle information is equal to or higher than a predetermined value.

(6) The imaging device according to any one of the above (1) to (5), wherein
the switching unit
switches the reading mode according to a region of a frame image based on the pixel signal.

(7) The imaging device according to the above (6), wherein
the switching unit
switches the reading mode to the individual mode for a predetermined region at a central portion of the frame image and switches the reading mode to the addition mode for a region other than the predetermined region of the frame image.

(8) The imaging device according to any one of the above (1) to (7), wherein
the switching unit
switches the reading mode on a basis of an object included in a frame image based on the pixel signal.

(9) The imaging device according to the above (8), wherein
in a case where a specific object is included in the frame image, the switching unit
performs switching of the reading mode for a specific region including the specific object in the frame image and a region other than the specific region.

(10) The imaging device according to the above (9), wherein
the imaging device is mounted on a vehicle and used, and
the switching unit
switches the reading mode to the individual mode for the specific region including the specific object, the specific object being at least one of a traffic light, a traffic sign, an oncoming vehicle, or a pedestrian.

(11) The imaging device according to any one of (1) to (10), wherein
the switching unit
switches the reading mode by controlling reading of the pixel included in the pixel array.

(12) The imaging device according to any one of the above (1) to (11), wherein
the switching unit
switches the reading mode by controlling image processing for the pixel signal output by the imaging unit.

(13) The imaging device according to any one of the above (1) to (12), further comprising
a combination unit that combines a first image based on a first pixel signal from the pixel that is exposed for a first exposure time and a second image based on a second pixel signal from the pixel that is exposed for a second exposure time following the exposure performed for the first exposure time.

(14) The imaging device according to any one of the above (1) to (13), wherein
in the pixel array,
the plurality of pixel groups include:
a first pixel group that receives light transmitted through a first optical filter;
a second pixel group that receives light transmitted through a second optical filter; and
a third pixel group that receives light transmitted through a third optical filter, and
the first pixel group, the second pixel group, and the third pixel group are arranged so that different pixel groups among the first pixel group, the second pixel group, and the third pixel group are adjacent to each other.

(15) The imaging device according to the above (14), further comprising
a remosaic processing unit that performs remosaic processing of converting each pixel included in each of the first pixel group, the second pixel group, and the third pixel group into a pixel having a characteristic corresponding to a position of each pixel in a case where the reading mode is the individual mode.

REFERENCE SIGNS LIST

1 IMAGING DEVICE
10 IMAGING UNIT
12 IMAGE PROCESSING UNIT
13 OUTPUT PROCESSING UNIT
14, 22 CONTROL UNIT
15 VEHICLE INFORMATION ACQUISITION UNIT
110, 110a PIXEL ARRAY UNIT
201L, 201M, 201S PROCESSING SWITCHING SWITCH
202L, 202M, 202S PIXEL ADDITION UNIT
203L, 203M, 203S REMOSAIC PROCESSING UNIT
204L, 204M, 204S SELECTOR
220 DETECTION UNIT
1200, 1200a, 1200b PIXEL PROCESSING UNIT
1201 HDR COMBINATION PROCESSING UNIT

The invention claimed is:

1. An imaging device comprising:
an imager that includes a pixel array including a plurality of pixel groups each including N×N pixels (N is an integer of 2 or more);
a memory storing a program; and
a processor configured to execute the program to perform operations comprising:
switching a reading mode in which pixel signals are respectively read from each of the pixels of the pixel array, the switching of the reading mode switching between an addition mode and an individual mode, wherein
in the addition mode the pixel signals read from the N×N pixels included in each of the pixel groups are added to form one pixel signal,
in the individual mode each of the pixel signals read from the N×N pixels included in each of the pixel groups is individually output, and
the switching of the reading mode is on a basis of vehicle information of a vehicle, the vehicle information including a speed of the vehicle.

2. The imaging device according to claim 1, wherein the vehicle information includes a brightness around the vehicle.

3. The imaging device according to claim 1, wherein the vehicle information includes a brightness around the vehicle, and the switching of the reading mode includes switching the reading mode to the individual mode in a case where the speed of the vehicle is equal to or higher than a first predetermined value and the brightness around the vehicle is equal to or higher than a second predetermined value.

4. The imaging device according to claim 1, wherein the switching of the reading mode includes switching the reading mode according to a region of a frame image based on the pixel signal.

5. The imaging device according to claim 4, wherein the switching of the reading mode includes switching the reading mode to the individual mode for a predetermined region at a central portion of the frame image and switching the reading mode to the addition mode for a region other than the predetermined region of the frame image.

6. The imaging device according to claim 1, wherein the switching of the reading mode includes switching the reading mode on a basis of an object included in a frame image based on the pixel signal.

7. The imaging device according to claim 6, wherein in a case where a specific object is included in the frame image, the switching of the reading mode includes performing switching of the reading mode for a specific region including the specific object in the frame image and a region other than the specific region.

8. The imaging device according to claim 7, wherein the imager is mounted on the vehicle, and the switching of the reading mode includes switching the reading mode to the individual mode for the specific region including the specific object, the specific object being at least one of a traffic light, a traffic sign, an oncoming vehicle, or a pedestrian.

9. The imaging device according to claim 1, wherein the switching of the reading mode switches the reading mode by controlling reading of the pixel array.

10. The imaging device according to claim 1, wherein the switching of the reading mode switches the reading mode by controlling image processing for the pixel signals output by the imager.

11. The imaging device according to claim 1, wherein the operations further comprise:
combining a first image based on a first pixel signal from a pixel that is exposed for a first exposure time and a second image based on a second pixel signal from the pixel that is exposed for a second exposure time following the exposure performed for the first exposure time.

12. The imaging device according to claim 1, wherein in the pixel array,
the plurality of pixel groups include:
a first pixel group that receives light transmitted through a first optical filter;
a second pixel group that receives light transmitted through a second optical filter; and
a third pixel group that receives light transmitted through a third optical filter, and
the first pixel group, the second pixel group, and the third pixel group are arranged so that different pixel groups among the first pixel group, the second pixel group, and the third pixel group are adjacent to each other.

13. The imaging device according to claim 12, wherein the operations further comprise:
performing remosaic processing of converting each pixel included in each of the first pixel group, the second pixel group, and the third pixel group into a pixel having a characteristic corresponding to a position of each pixel in a case where the reading mode is the individual mode.

14. A non-transitory computer readable medium storing a program for processing pixel signals of an imager that includes a pixel array including a plurality of pixel groups each including N×N pixels (N is an integer of 2 or more), the program being executable by a processor to perform operations comprising:
switching a reading mode in which the pixel signals are respectively read from each of the pixels of the pixel array, the switching of the reading mode switching between an addition mode and an individual mode, wherein
in the addition mode the pixel signals read from the N×N pixels included in each of the pixel groups are added to form one pixel signal,
in the individual mode each of the pixel signals read from the N×N pixels included in each of the pixel groups is individually output, and
the switching of the reading mode is on a basis of vehicle information of a vehicle, the vehicle information including a speed of the vehicle.

15. The non-transitory computer readable medium according to claim 14, wherein the vehicle information includes a brightness around the vehicle.

16. The non-transitory computer readable medium according to claim 14, wherein the vehicle information includes a brightness around the vehicle, and the switching of the reading mode includes switching the reading mode to the individual mode in a case where the speed of the vehicle is equal to or higher than a first predetermined value and the brightness around the vehicle is equal to or higher than a second predetermined value.

17. The non-transitory computer readable medium according to claim 14, wherein the switching of the reading mode includes switching the reading mode according to a region of a frame image based on the pixel signal.

18. The non-transitory computer readable medium according to claim 17, wherein the switching of the reading mode includes switching the reading mode to the individual mode for a predetermined region at a central portion of the frame image and switching the reading mode to the addition mode for a region other than the predetermined region of the frame image.

19. The non-transitory computer readable medium according to claim 14, wherein the switching of the reading mode includes switching the reading mode on a basis of an object included in a frame image based on the pixel signal.

20. The non-transitory computer readable medium according to claim 19, wherein in a case where a specific object is included in the frame image, the switching of the reading mode includes performing switching of the reading mode for a specific region including the specific object in the frame image and a region other than the specific region.

* * * * *